United States Patent
Torres et al.

(10) Patent No.: US 9,834,682 B2
(45) Date of Patent: *Dec. 5, 2017

(54) LAUNDRY CARE COMPOSITION COMPRISING CARBOXYLATE DYE

(71) Applicant: Milliken & Company, Spartanburg, SC (US)

(72) Inventors: Eduardo Torres, Boiling Springs, SC (US); Sanjeev Kumar Dey, Spartanburg, SC (US); Gregory Scot Miracle, Liberty Township, OH (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,852

(22) Filed: Sep. 4, 2014

(65) Prior Publication Data

US 2015/0080561 A1 Mar. 19, 2015

Related U.S. Application Data

(60) Provisional application No. 61/879,185, filed on Sep. 18, 2013, provisional application No. 61/879,209, filed on Sep. 18, 2013, provisional application No. 61/879,223, filed on Sep. 18, 2013, provisional application No. 61/879,229, filed on Sep. 18, 2013.

(51) Int. Cl.
| | |
|---|---|
| *C09B 29/36* | (2006.01) |
| *C11D 3/42* | (2006.01) |
| *C09B 29/08* | (2006.01) |
| *C09B 29/42* | (2006.01) |
| *C09B 29/033* | (2006.01) |
| *C09B 69/00* | (2006.01) |
| *C11D 3/40* | (2006.01) |

(52) U.S. Cl.
CPC ...... *C09B 29/3691* (2013.01); *C09B 29/0059* (2013.01); *C09B 29/0802* (2013.01); *C09B 29/3639* (2013.01); *C09B 69/00* (2013.01); *C11D 3/40* (2013.01); *C11D 3/42* (2013.01)

(58) Field of Classification Search
CPC .................................................. C09B 29/3691
See application file for complete search history.

(56) References Cited

U.S. PATENT DOCUMENTS

| | | | |
|---|---|---|---|
| 4,249,902 A | 2/1981 | Kruckenberg et al. | |
| 4,346,161 A * | 8/1982 | Krutak et al. ................ | 430/223 |
| 4,939,118 A * | 7/1990 | Etzbach et al. ............... | 503/227 |
| 5,440,024 A * | 8/1995 | Himeno et al. ............... | 534/766 |
| 2004/0187734 A1 | 9/2004 | Ozawa et al. | |
| 2007/0117031 A1 | 5/2007 | Mizukawa et al. | |
| 2012/0178665 A1 * | 7/2012 | Valenti et al. ................ | 510/324 |

FOREIGN PATENT DOCUMENTS

| | | | | |
|---|---|---|---|---|
| EP | 0392358 B1 * | 12/1993 | ............ | C09B 67/22 |
| WO | WO 2011/011799 A2 | 1/2011 | | |
| WO | WO 2011/017719 A2 | 2/2011 | | |
| WO | WO 2012/166584 A1 | 12/2012 | | |
| WO | WO 2012/166699 A1 | 12/2012 | | |
| WO | WO 2012/166768 A1 | 12/2012 | | |
| WO | WO 2013/006871 A2 | 1/2013 | | |
| WO | WO 2013/142486 A1 | 9/2013 | | |
| WO | WO 2014/089386 A1 | 6/2014 | | |

OTHER PUBLICATIONS

CAPLUS Abstract of DD 157911 (Pub date 1982).*
CAPLUS Abstract of U.S. Pat. No. 4,346,161 (Pub date 1982).*
Hahn et al. (Machine translation of EP 0392358 B1) (Publication date: Dec. 1, 1993).*
International Search Report. International application No. PCT/US2014/054678; International filing date Sep. 9, 2014.

* cited by examiner

*Primary Examiner* — Robert Havlin
(74) *Attorney, Agent, or Firm* — Brenda D. Wentz

(57) ABSTRACT

The present invention relates to laundry care compositions comprising carboxylate dyes. The laundry care compositions can be laundry detergent compositions, laundry additive compositions such as fabric enhancer compositions or bleach additive compositions. Preferably, the laundry care composition is a laundry detergent composition. The composition can be a solid, such as a powder, tablet or bar, or a liquid. The composition can be in the form of a unit dose, such as pouch. Suitable unit dose pouches include single compartment and multi-compartment pouches.

1 Claim, No Drawings

LAUNDRY CARE COMPOSITION COMPRISING CARBOXYLATE DYE

CROSS-REFERENCE TO RELATED APPLICATIONS

This application claims priority to and the benefit of the following: U.S. Patent Application Ser. No. 61/879,185, entitled "Laundry Care Composition Comprising Carboxylate Dye," which was filed on Sep. 18, 2013; U.S. Patent Application Ser. No. 61/879,209, entitled "Laundry Care Composition Comprising Carboxylate Dye," which was filed on Sep. 18, 2013; U.S. Patent Application Ser. No. 61/879,223, entitled "Laundry Care Composition Comprising Carboxylate Dye," which was filed on Sep. 18, 2013; and U.S. Patent Application Ser. No. 61/879,229, entitled "Laundry Care Composition Comprising Carboxylate Dye," which was filed on Sep. 18, 2013; all of which are entirely incorporated by reference herein.

FIELD OF THE INVENTION

The present invention relates to laundry care compositions comprising carboxylate dyes. The laundry care compositions can be laundry detergent compositions, laundry additive compositions such as fabric enhancer compositions or bleach additive compositions. Preferably, the laundry care composition is a laundry detergent composition. The composition can be a solid, such as a powder, tablet or bar, or a liquid. The composition can be in the form of a unit dose, such as pouch. Suitable unit dose pouches include single compartment and multi-compartment pouches.

BACKGROUND OF THE INVENTION

As textiles age, their color tends to fade or yellow due to exposure to light, air, soil, and natural degradation of the fibers. To mitigate this unwanted effect, laundry detergent manufacturers incorporate shading dyes into their products. The purpose of shading dyes is typically to counteract the fading and yellowing of the textiles by providing a blue-violet hue to the laundered fabrics, reducing the visual impact of the yellowing. In laundry care compositions dyes may be affected by interaction with laundry care adjuncts in the composition. This can lead to changes in the dye properties, such as deposition properties, which either may not generate sufficient fabric shading or which may lead to undesirable build up over time on fabric surfaces, especially nylon fabric. There remains a need to provide a laundry care composition that comprises a shading dye that has a good deposition profile onto nylon fabric, and that has a good removal profile from nylon fabric during the subsequent laundering process so as to prevent any unwanted dye build up on the nylon fabric. In addition, such shading dyes should also provide good stability profile in laundry care composition during storage.

SUMMARY OF THE INVENTION

The present invention provides a laundry care composition comprising from 0.00001 wt % to 0.5 wt % thiophene azo carboxylate dye having the structure of Formula I:

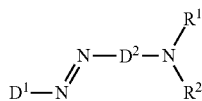

Formula I wherein $D^1$ is a thiophene group;
wherein $D^2$ is a carbocylic phenylene;
wherein the two N atoms shown in Formula I bound directly to the carbocyclic phenylene are in a para-substitution to one another;
wherein $R^1$ is independently selected from $[(CH_2CR'HO)_x (CH_2CR''HO)_y((CH_2)_wNH)_zQ]$; $C_{1-12}$ alkyl, $C_{6-10}$ aryl, or $C_7$-$C_{22}$ aryl alkyl;
wherein $R^2$ is $[(CH_2CR'HO)_{x'}(CH_2CR''HO)_{y'}((CH_2)_{w'}NH)_{z'}Q]$;
wherein the sum of $x+y+x'+y'$ is in the range of from 0 to 50;
wherein x is an integer from 0 to 50;
wherein x' is an integer from 0 to 50;
wherein y is an integer from 0 to 50;
wherein y' is an integer from 0 to 50;
wherein w and w' are integers independently selected from 2 and 3;
wherein z and z' are integers independently selected from 0 and 1;
wherein R' and R" are each independently selected from the group consisting of H, $C_1$-$C_4$ alkyl, $CH_2O(CH_2CH_2O)_a((CH_2)_bNH)_dQ$, phenyl and $CH_2OR^5$;
wherein each $R^5$ is independently selected from the group consisting of $C_1$-$C_{16}$ linear or branched alkyl, $C_6$-$C_{14}$ aryl, and $C_7$-$C_{16}$ arylalkyl;
wherein each a is an integer independently selected from 0 to 2;
wherein each b is an integer independently selected from 2 to 3;
wherein each d is an integer independently selected from 0 to 1;
wherein each Q is independently selected from the group consisting of H and Y, preferably all Q groups are independently selected Y groups;
wherein each Y is an independently selected organic radical represented by Formula II

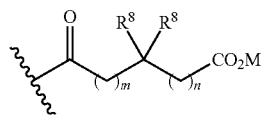

Formula II wherein independently for each Y group:
M is H or a charge balancing cation;
m is an integer selected from 0 to 5, preferably 0, 1, 2 or 3, more preferably 0 or 1;
n is an integer selected from 0 to 5, preferably 0, 1, 2 or 3, more preferably 0 or 1;
the sum of m+n is in the range of from 1 to 10, preferably 1, 2 or 3, more preferably 1 or 2; and
each $R^8$ is independently selected from the group consisting of H, $C_{3-18}$ or $C_{4-18}$ linear or branched alkyl, and $C_{3-18}$ or $C_{4-18}$ linear or branched alkenyl;
at least one $R^8$ group is not H;
wherein the sum of $z+z'+d$ is at least 1;

characterized in that the dye comprises at least one Q group that is Y and is either:
(a) bound to a N atom in an $R^1$ group wherein the index z is 1; or
(b) bound to a N atom in an $R^2$ group wherein the index z' is 1; or
(c) bound to a N atom in an R' or R" group wherein the index d is 1.

In another aspect, the present invention provides a laundry care composition comprising from 0.00001 wt % to 0.5 wt % mono-azo carboxylate dye having the structure of Formula I:

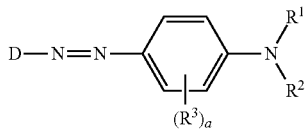

Formula I wherein each $R^3$ is independently selected from the group consisting of alkyl, oxyalkyl, oxyaryl, sulfonamidoalkyl, sulfonamidoaryl, amidoalkyl, amidodialkyl, amidoaryl, amidodiaryl, halogen, thioalkyl and thioaryl;
wherein the index a is an integer from 0 to 4, preferably from 0 to 2;
wherein D is an aromatic or heteroaromatic group, with the proviso that the heteroaromatic group is not a thiophene;
wherein $R^1$ is independently selected from the group consisting of:
(a) unsubstituted or substituted $C_1$ to $C_{12}$ alkyl chains, optionally the alkyl chains comprise ether (C—O—C), ester and/or amide links, optionally the alkyl chains are substituted with —Cl, —Br, —CN, —NO$_2$, —SO$_2$CH$_3$, —OH and mixtures thereof; and
(b) $(CH_2CH_2O)_y((CH_2)_wNH)_zQ$;
wherein $R^2$ is $(CH_2CH_2O)_{y'}((CH_2)_{w'}NH)_{z'}Q'$;
wherein y and y' are independently selected integers from 0 to 39;
wherein the sum of y+y' is in the range of from 3 to 35, preferably from 3 to 30, preferably from 3 to 20, preferably from 3 to 10, preferably from 3 to 5;
wherein w and w' are independently selected integers from 2 and 3;
wherein z and z' are independently selected integers from 0 and 1;
wherein z is 1 when y is 0; and wherein z' is 1 when y' is 0;
wherein Q and Q' are independently selected from the group consisting of H and Y;
wherein at least one Q or Q' group is Y, preferably both Q and Q' are Y;
wherein Y is an organic radical represented by Formula II

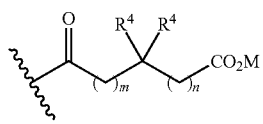

Formula II wherein independently for each Y group:
M is H or a charge balancing cation;
m is 0 to 5, preferably 0, 1, 2 or 3, more preferably 0 or 1;
n is 0 to 5, preferably 0, 1, 2 or 3, more preferably 0 or 1;
and the sum of m+n is in the range of from 1 to 10, preferably 1, 2 or 3, more preferably 1 or 2;
each $R^4$ is independently selected from the group consisting of H, $C_{3-18}$ or $C_4$-$C_{18}$ linear or branched alkyl, $C_{3-18}$ or $C_4$-$C_{18}$ linear or branched alkenyl, and mixtures thereof;
and wherein at least one $R^4$ group is not H; and
preferably wherein the sum of carbon atoms in all the $R^4$ groups is in the range of from 0.4(y+y') to 3.0(y+y'), preferably from 0.6(y+y') to 1.6(y+y').

In a further aspect, the present invention provides a laundry care composition comprising from 0.00001 wt % to 0.5 wt % mono-azo carboxylate dye having the structure of Formula III:

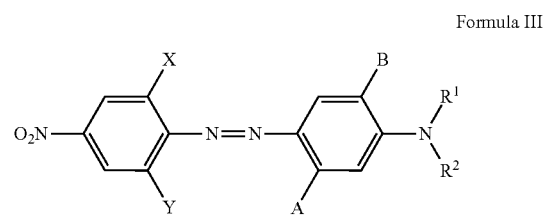

Formula III wherein X and Y are independently selected from the group consisting of —H, —Cl, —Br, —CN, —NO$_2$, and —SO$_2$CH$_3$;
wherein A is selected from —H, —CH$_3$, —Cl, and —NHCOR,
wherein R is $C_1$-$C_8$ alkyl;
wherein B is selected from —H, —OCH$_3$, —OC$_2$H$_5$, and —Cl;
wherein $R^1$ is independently selected from the group consisting of:
(a) substituted or unsubstituted $C_1$ to $C_{12}$ alkyl chains, wherein the alkyl chains optionally comprise ether (C—O—C), ester and/or amide links, wherein the alkyl chains are optionally substituted with —Cl, —Br, —CN, —NO$_2$, —SO$_2$CH$_3$, —OH and mixtures thereof; and
(b) $(CH_2CH_2O)_y((CH_2)_wNH)_zQ$;
wherein $R^2$ is $(CH_2CH_2O)_{y'}((CH_2)_{w'}NH)_{z'}Q'$;
wherein y and y' are independently selected integers from 0 to 39;
wherein the sum (y+y') is in the range of from 3 to 35, preferably from 3 to 20, preferably from 3 to 10, preferably from 3 to 5;
wherein w and w' are independently selected from 2 and 3;
wherein z and z' are independently selected from 0 and 1;
wherein z is 1 when y is 0; wherein z' is 1 when y' is 0;
wherein Q and Q' are independently selected from the group consisting of H and Y; with
wherein at least one Q or Q' group that is Y, preferably both Q and Q' are Y;

wherein Y is an organic radical represented by Formula II

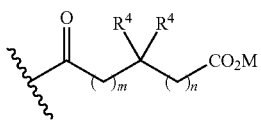

Formula II wherein independently for each Y group:

M is H or a charge balancing cation;

m is 0 to 5, preferably 0, 1, 2 or 3, more preferably 0 or 1;

n is 0 to 5, preferably 0, 1, 2 or 3, more preferably 0 or 1;

the sum of m+n is 1 to 10, preferably 1, 2 or 3, more preferably 1 or 2;

each $R^4$ is independently selected from the group consisting of H, $C_{3-18}$ or $C_4$-$C_{18}$ linear or branched alkyl, $C_{3-18}$ or $C_4$-$C_{18}$ linear or branched alkenyl, and mixtures thereof;

at least one $R^4$ group is not H, and preferably the sum of carbon atoms in all the $R^4$ groups is in the range of from 0.4(y+y') to ≤3.0(y+y'), preferably from 0.6(y+y') to 1.6(y+y').

In another aspect, the present invention provides a laundry care composition comprising from 0.00001 wt % to 0.5 wt % mono-azo carboxylate dye having the structure of Formula IV:

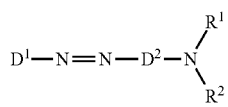

Formula IV wherein $D^1$ is an aromatic heterocyclic group;

wherein $D^2$ is a heteroaromatic group;

wherein $R^1$ is independently selected from the group consisting of:

(a) unsubstituted or substituted $C_1$ to $C_{12}$ alkyl chains, optionally the alkyl chains comprising ether (C—O—C), ester and/or amide links, optionally, the alkyl chains are substituted with —Cl, —Br, —CN, —$NO_2$, —$SO_2CH_3$, —OH and mixtures thereof; and (b) $(CH_2CH_2O)_y((CH_2)_wNH)_zQ$;

wherein $R^2$ is $(CH_2CH_2O)_{y'}((CH_2)_{w'}NH)_{z'}Q'$;

wherein y and y' are independently selected integers from 0 to 39;

wherein the sum of y+y' is in the range of from 3 to 30, preferably from 3 to 20, preferably from 3 to 10, preferably from 3 to 5;

wherein w and w' are independently selected from 2 and 3;

wherein z and z' are independently selected from 0 and 1;

wherein z is 1 when y is 0; wherein z' is 1 when y' is 0;

wherein Q and Q' are independently selected from the group consisting of H and Y;

wherein at least one Q or Q' group is Y, preferably both Q and Q' are Y;

wherein Y is an organic radical represented by Formula V

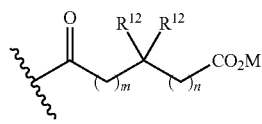

Formula V wherein independently for each Y group:

M is H or a charge balancing cation;

m is 0 to 5, preferably 0, 1, 2 or 3, more preferably 0 or 1;

n is 0 to 5, preferably 0, 1, 2 or 3, more preferably 0 or 1;

the sum of m+n is 1 to 10, preferably 1, 2 or 3, more preferably 1 or 2;

each $R^4$ is independently selected from the group consisting of H, $C_{3-18}$ or $C_4$-$C_{18}$ linear or branched alkyl, $C_{3-18}$ or $C_4$-$C_{18}$ linear or branched alkenyl, and mixtures thereof, at least one $R^{12}$ group is not H, and preferably the sum of carbon atoms in all the $R^{12}$ groups is in the range of from 0.4(y+y') to 3.0(y+y'), preferably from 0.6(y+y') to 1.6(y+y').

Further, for the mono-azo carboxylate dye having the structure of Formula IV:

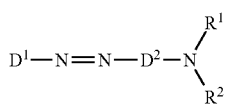

Formula IV $D^1$ and $D^2$ may be independently selected from thiophene, thiazole, isothiazole, thiadiazole, and pyridinyl and/or the mono-azo carboxylate dye may be selected from

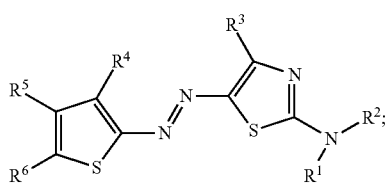

Formula VI

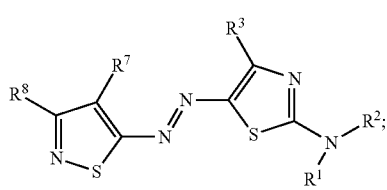

Formula VII

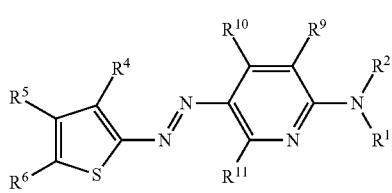

Formula VIII and mixtures thereof, wherein $R^3$ is selected from acid amide, $C_1$-$C_8$ alkyl, heteroaromatic and aryl, preferably NHC(O)$CH_3$, phenyl, and thienyl;

wherein $R^4$ is selected from CN, $NO_2$, alkoxy, carboxylic acid ester, alkyl sulfonyl and arylsulfonyl, preferably CN;

wherein $R^5$ is selected from F, Cl, Br, CN, $NO_2$, alkoxy, phenyl, benzyl, amine, alkyl, and carboxylic acid ester, preferably methyl and ethyl;

wherein $R^6$ is selected from H, CN, $NO_2$, alkoxy, alkyl sulfonyl, arylsulfonyl and carboxylic acid ester;

wherein $R^7$ is selected from CN, SCN, F, Cl, and Br, preferably CN;

wherein $R^8$ is selected from $C_1$-$C_8$ alkyl, heteroaromatic and aryl, preferably thienyl and phenyl;

wherein $R^9$ is selected from CN, $NH_2C(O)$, $NO_2$, and acetyl, preferably CN;

wherein $R^{10}$ is selected from $C_1$-$C_8$ alkyl, preferably methyl and ethyl;

wherein $R^{11}$ is an acid amide, preferably $NHC(O)CH_3$.

DETAILED DESCRIPTION OF THE INVENTION

Definitions

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, unless otherwise specified, the terms "alkyl" and "alkyl capped" are intended to include $C_1$-$C_{18}$ alkyl groups, and in one aspect, $C_1$-$C_6$ alkyl groups.

As used herein, unless otherwise specified, the term "aryl" is intended to include $C_3$-$C_{12}$ aryl groups.

As used herein, unless otherwise specified, the term "arylalkyl" is intended to include $C_1$-$C_{18}$ alkyl groups and, in one aspect, $C_1$-$C_6$ alkyl groups.

The terms "ethylene oxide," "propylene oxide" and "butylene oxide" may be shown herein by their typical designation of "EO," "PO" and "BO," respectively.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, the term "detergent composition" is a sub-set of laundry care composition and includes cleaning compositions including but not limited to products for laundering fabrics. Such compositions may be pre-treatment composition for use prior to a washing step or may be rinse added compositions, as well as cleaning auxiliaries, such as bleach additives and "stain-stick" or pre-treat types.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the term "maximum extinction coefficient" is intended to describe the molar extinction coefficient at the wavelength of maximum absorption (also referred to herein as the maximum wavelength), in the range of 400 nanometers to 750 nanometers.

As used herein "average molecular weight" of the thiophene azo carboxylate dyes is reported as an average molecular weight, as determined by its molecular weight distribution: as a consequence of their manufacturing process, the thiophene azo carboxylate dyes disclosed herein may contain a distribution of repeating units in their polymeric moiety.

The test methods disclosed in the Test Methods Section of the present application should be used to determine the respective values of the parameters of Applicants' inventions.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

Carboxylate Dye:

Suitable dyes are thiophene azo carboxylate dyes having the structure of Formula I:

$$D^1-N \overset{}{\underset{}{=}} N-D^2-N\overset{R^1}{\underset{R^2}{}}$$
Formula I wherein $D^1$ is a thiophene group;

wherein $D^2$ is a carbocylic phenylene;

wherein the two N atoms shown in Formula I bound directly to the carbocyclic phenylene are in a para-substitution to one another;

wherein $R^1$ is independently selected from $[(CH_2CR'HO)_x(CH_2CR''HO)_y((CH_2)_wNH)_zQ]$, $C_{1-12}$ alkyl, $C_{6-10}$ aryl, or $C_7$-$C_{22}$ aryl alkyl;

wherein $R^2$ is $[(CH_2CR'HO)_x(CH_2CR''HO)_{y'}((CH_2)_{w'}NH)_zQ]$;

wherein the sum of x+y+x'+y' is in the range of from 0 to 50;

wherein x is an integer from 0 to 50;

wherein x' is an integer from 0 to 50;

wherein y is an integer from 0 to 50;

wherein y' is an integer from 0 to 50;

wherein w and w' are integers independently selected from 2 and 3;

wherein z and z' are integers independently selected from 0 and 1;
wherein R' and R" are each independently selected from the group consisting of H, $C_1$-$C_4$ alkyl, $CH_2O(CH_2CH_2O)_a$ $((CH_2)_bNH)_dQ$, phenyl and $CH_2OR^5$;
wherein each $R^5$ is independently selected from the group consisting of $C_1$-$C_{16}$ linear or branched alkyl, $C_6$-$C_{14}$ aryl, and $C_7$-$C_{16}$ arylalkyl;
wherein each a is an integer independently selected from 0 to 2;
wherein each b is an integer independently selected from 2 to 3;
wherein each d is an integer independently selected from 0 to 1;
wherein each Q is independently selected from the group consisting of H and Y, preferably all Q groups are independently selected Y groups;
wherein each Y is an independently selected organic radical represented by Formula II:

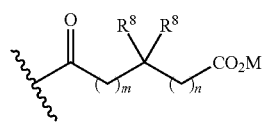

Formula II wherein independently for each Y group:
M is H or a charge balancing cation;
m is an integer selected from 0 to 5, preferably 0, 1, 2 or 3, more preferably 0 or 1;
n is an integer selected from 0 to 5, preferably 0, 1, 2 or 3, more preferably 0 or 1;
the sum of m+n is in the range of from 1 to 10, preferably 1, 2 or 3, more preferably 1 or 2; and
each $R^8$ is independently selected from the group consisting of H, $C_{3-18}$ or $C_4$-$C_{18}$ linear or branched alkyl, and $C_{3-18}$ or $C_4$-$C_{18}$ linear or branched alkenyl;
at least one $R^8$ group is not H;
wherein the sum of z+z'+d is at least 1;
characterized in that the dye comprises at least one Q group that is Y and is either:
(a) bound to a N atom in an $R^1$ group wherein the index z is 1; or
(b) bound to a N atom in an $R^2$ group wherein the index z' is 1; or
(c) bound to a N atom in an R' or R" group wherein the index d is 1.

Suitable thiophene azo carboxylate dyes have the structure of Formula III:

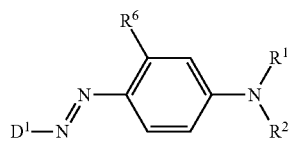

Formula III wherein $D^1$ is a thiophene group;
wherein $R^6$ is selected from the group consisting of H and $C_1$-$C_4$ alkyl;
wherein $R^1$ and $R^2$ are defined according to claim 1.

Suitable thiophene azo carboxylate dyes have the structure of Formula IV:

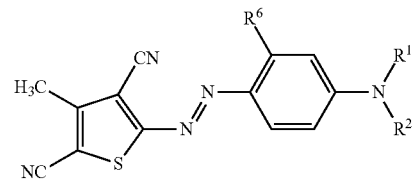

Formula IV wherein $R^6$ is selected from the group consisting of H and methyl;
wherein $R^1$ and $R^2$ are defined according to claim 1, wherein each m is independently selected from 0 to 3, and wherein each n is independently selected from 0 to 3.

Suitable thiophene azo carboxylate dyes have a structure according to Formula IV, wherein $R^1$ is $[(CH_2CH_2O)_y(CH_2)_wNHQ]$;
wherein $R^2$ is $[(CH_2CH_2O)_y(CH_2)_wNHQ]$;
wherein m is 0 or 1;
wherein n is 0 or 1;
wherein the sum of m+n is 1 or 2; and wherein when the sum of y+y' is at least 10 then preferably the sum of carbon atoms in all the $R^8$ groups is greater than 0.4(y+y'), more preferably greater than 0.6(y+y'), and preferably less than 3.0(y+y'), preferably less than 2.0(y+y'), more preferably less than 1.8(y+y'), and most preferably less than 1.6(y+y').

Additional suitable dyes are mono-azo carboxylate dyes having the structure of Formula I:

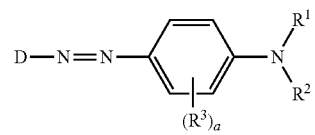

Formula I wherein each $R^3$ is independently selected from the group consisting of alkyl, oxyalkyl, oxyaryl, sulfonamidoalkyl, sulfonamidoaryl, amidoalkyl, amidodialkyl, amidoaryl, amidodiaryl, halogen, thioalkyl and thioaryl;
wherein the index a is an integer from 0 to 4, preferably from 0 to 2;
wherein D is an aromatic or heteroaromatic group, with the proviso that the heteroaromatic group is not a thiophene;
wherein $R^1$ is independently selected from the group consisting of:
(a) unsubstituted or substituted $C_1$ to $C_{12}$ alkyl chains, optionally the alkyl chains comprise ether (C—O—C), ester and/or amide links, optionally the alkyl chains are substituted with —Cl, —Br, —CN, —NO$_2$, —SO$_2$CH$_3$, —OH and mixtures thereof; and
(b) $(CH_2CH_2O)_y((CH_2)_wNH)_zQ$;
wherein $R^2$ is $(CH_2CH_2O)_{y'}((CH_2)_{w'}NH)_{z'}Q'$;
wherein y and y' are independently selected integers from 0 to 39;
wherein the sum of y+y' is in the range of from 3 to 35, preferably from 3 to 30, preferably from 3 to 20, preferably from 3 to 10, preferably from 3 to 5;
wherein w and w' are independently selected integers from 2 and 3;
wherein z and z' are independently selected integers from 0 and 1;
wherein z is 1 when y is 0; and wherein z' is 1 when y' is 0;
wherein Q and Q' are independently selected from the group consisting of H and Y;

wherein at least one Q or Q' group is Y, preferably both Q and Q' are Y;
wherein Y is an organic radical represented by Formula II

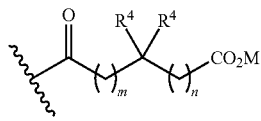

Formula II wherein independently for each Y group:
M is H or a charge balancing cation;
m is 0 to 5, preferably 0, 1, 2 or 3, more preferably 0 or 1;
n is 0 to 5, preferably 0, 1, 2 or 3, more preferably 0 or 1;
and the sum of m+n is in the range of from 1 to 10, preferably 1, 2 or 3, more preferably 1 or 2;
each $R^4$ is independently selected from the group consisting of H, $C_{3-18}$ or $C_4$-$C_{18}$ linear or branched alkyl, $C_{3-18}$ or $C_4$-$C_{18}$ linear or branched alkenyl, and mixtures thereof;
and wherein at least one $R^4$ group is not H; and
preferably wherein the sum of carbon atoms in all the $R^4$ groups is in the range of from 0.4(y+y') to 3.0(y+y'), preferably from 0.6(y+y') to 1.6(y+y').
Further suitable dyes include mono-azo carboxylate dyes having the structure of Formula III:

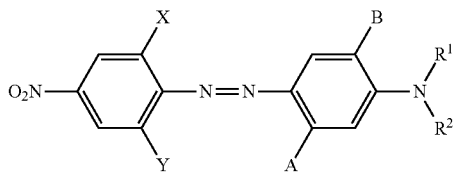

Formula III wherein X and Y are independently selected from the group consisting of —H, —Cl, —Br, —CN, —$NO_2$, and —$SO_2CH_3$;
wherein A is selected from —H, —$CH_3$, —Cl, and —NHCOR,
wherein R is $C_1$-$C_8$ alkyl;
wherein B is selected from —H, —$OCH_3$, —$OC_2H_5$, and —Cl;
wherein $R^1$ is independently selected from the group consisting of:
(a) substituted or unsubstituted $C_1$ to $C_{12}$ alkyl chains, wherein the alkyl chains optionally comprise ether (C—O—C), ester and/or amide links, wherein the alkyl chains are optionally substituted with —Cl, —Br, —CN, —$NO_2$, —$SO_2CH_3$, —OH and mixtures thereof; and
(b) $(CH_2CH_2O)_y((CH_2)_wNH)_zQ$;
wherein $R^2$ is $(CH_2CH_2O)_{y'}((CH_2)_wNH)_zQ'$;
wherein y and y' are independently selected integers from 0 to 39;
wherein the sum (y+y') is in the range of from 3 to 35, preferably from 3 to 20, preferably from 3 to 10, preferably from 3 to 5;
wherein w and w' are independently selected from 2 and 3;
wherein z and z' are independently selected from 0 and 1;
wherein z is 1 when y is 0; wherein z' is 1 when y' is 0;

wherein Q and Q' are independently selected from the group consisting of H and Y; with wherein at least one Q or Q' group that is Y, preferably both Q and Q' are Y;
wherein Y is an organic radical represented by Formula II

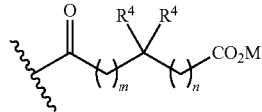

Formula II wherein independently for each Y group:
M is H or a charge balancing cation;
m is 0 to 5, preferably 0, 1, 2 or 3, more preferably 0 or 1;
n is 0 to 5, preferably 0, 1, 2 or 3, more preferably 0 or 1;
the sum of m+n is 1 to 10, preferably 1, 2 or 3, more preferably 1 or 2;
each $R^4$ is independently selected from the group consisting of H, $C_{3-18}$ or $C_4$-$C_{18}$ linear or branched alkyl, $C_3$-18 or $C_4$-$C_{18}$ linear or branched alkenyl, and mixtures thereof;
at least one $R^4$ group is not H, and
preferably the sum of carbon atoms in all the $R^4$ groups is in the range of from 0.4(y+y') to ≤3.0(y+y'), preferably from 0.6(y+y') to 1.6(y+y').
Additional suitable dyes include mono-azo carboxylate dyes having the structure of Formula IV:

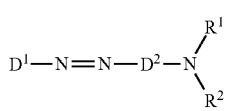

Formula IV wherein $D^1$ is an aromatic heterocyclic group;
wherein $D^2$ is a heteroaromatic group;
wherein $R^1$ is independently selected from the group consisting of:
(a) unsubstituted or substituted $C_1$ to $C_{12}$ alkyl chains, optionally the alkyl chains comprising ether (C—O—C), ester and/or amide links, optionally, the alkyl chains are substituted with —Cl, —Br, —CN, —$NO_2$, —$SO_2CH_3$, —OH and mixtures thereof; and
(b) $(CH_2CH_2O)_y((CH_2)_wNH)_zQ$;
wherein $R^2$ is $(CH_2CH_2O)_{y'}((CH_2)_wNH)_zQ'$;
wherein y and y' are independently selected integers from 0 to 39;
wherein the sum of y+y' is in the range of from 3 to 30, preferably from 3 to 20, preferably from 3 to 10, preferably from 3 to 5;
wherein w and w' are independently selected from 2 and 3;
wherein z and z' are independently selected from 0 and 1;
wherein z is 1 when y is 0; wherein z' is 1 when y' is 0;
wherein Q and Q' are independently selected from the group consisting of H and Y;
wherein at least one Q or Q' group is Y, preferably both Q and Q' are Y;

wherein Y is an organic radical represented by Formula V

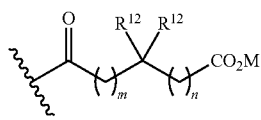

Formula V wherein independently for each Y group:
M is H or a charge balancing cation;
m is 0 to 5, preferably 0, 1, 2 or 3, more preferably 0 or 1;
n is 0 to 5, preferably 0, 1, 2 or 3, more preferably 0 or 1;
the sum of m+n is 1 to 10, preferably 1, 2 or 3, more preferably 1 or 2;
each $R^4$ is independently selected from the group consisting of H, $C_{3-18}$ or $C_4$-$C_{18}$ linear or branched alkyl, $C_{3-18}$ or $C_4$-$C_{18}$ linear or branched alkenyl, and mixtures thereof,
at least one $R^{12}$ group is not H, and
preferably the sum of carbon atoms in all the $R^{12}$ groups is in the range of from 0.4(y+y') to 3.0(y+y'), preferably from 0.6(y+y') to 1.6(y+y').

Further, for the mono-azo carboxylate dye having the structure of Formula IV:

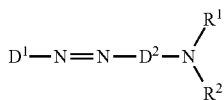

Formula IV $D^1$ and $D^2$ may be independently selected from thiophene, thiazole, isothiazole, thiadiazole, and pyridinyl and/or the mono-azo carboxylate dye may be selected from

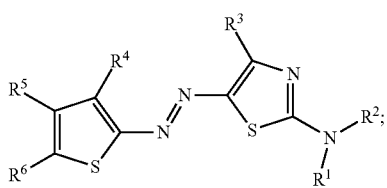

Formula VI

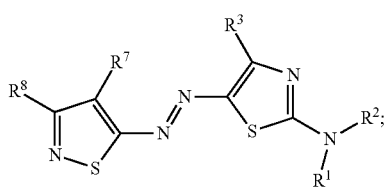

Formula VII

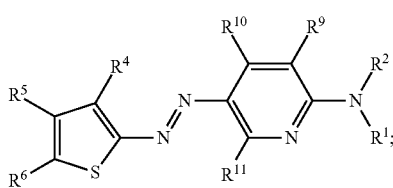

Formula VIII and mixtures thereof,
wherein $R^3$ is selected from acid amide, $C_1$-$C_8$ alkyl, heteroaromatic and aryl, preferably $NHC(O)CH_3$, phenyl, and thienyl;
wherein $R^4$ is selected from CN, $NO_2$, alkoxy, carboxylic acid ester, alkyl sulfonyl and arylsulfonyl, preferably CN;
wherein $R^5$ is selected from F, Cl, Br, CN, $NO_2$, alkoxy, phenyl, benzyl, amine, alkyl, and carboxylic acid ester, preferably methyl and ethyl;
wherein $R^6$ is selected from H, CN, $NO_2$, alkoxy, alkyl sulfonyl, arylsulfonyl and carboxylic acid ester;
wherein $R^7$ is selected from CN, SCN, F, Cl, and Br, preferably CN;
wherein $R^8$ is selected from C1-C8 alkyl, heteroaromatic and aryl, preferably thienyl and phenyl;
wherein $R^9$ is selected from CN, $NH_2C(O)$, $NO_2$, and acetyl, preferably CN;
wherein $R^{10}$ is selected from C1-C8 alkyl, preferably methyl and ethyl;
wherein $R^{11}$ is an acid amide, preferably $NHC(O)CH_3$.

Laundry Care Ingredients:

The composition may optionally comprise other laundry care ingredients. Suitable laundry care ingredients may be, for example to assist or enhance cleaning performance, for example to assist or enhance softening or freshening performance, or to modify the aesthetics of the composition as is the case with perfumes, colorants, non-fabric-shading dyes or the like.

Suitable laundry care ingredients include, but are not limited to, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, fabric softeners, carriers, hydrotropes, processing aids, solvents, additional dyes and/or pigments, some of which are discussed in more detail below.

Additional Fabric Hueing Agents:

Although it may not be preferred to incorporate additional fabric shading dyes, in addition to the carboxylate dye, the composition may comprise one or more additional fabric hueing agents. Suitable fabric hueing agents include dyes, dye-clay conjugates, and pigments. Suitable dyes include those that deposit more onto cotton textiles compared to deposition onto synthetic textiles such as polyester and/or nylon. Further suitable dyes include those that deposit more onto synthetic fibres such as polyester and/or nylon compared to cotton. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. Examples of small molecule dyes include those selected from the group consisting of Colour Index (Society of Dyers and Colourists, Bradford, UK) numbers Direct Violet 9, Direct Violet 35, Direct Violet 48, Direct Violet 51, Direct Violet 66, Direct Violet 99, Direct Blue 1, Direct Blue 71, Direct Blue 80, Direct Blue 279, Acid Red 17, Acid Red 73, Acid Red 88, Acid Red 150, Acid Violet 15, Acid Violet 17, Acid Violet 24, Acid Violet 43, Acid Red 52, Acid Violet 49, Acid Violet 50, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, Acid Black 1, Basic Violet 1, Basic Violet 3, Basic Violet 4, Basic Violet 10, Basic Violet 35, Basic Blue 3, Basic Blue 16, Basic Blue 22, Basic Blue 47, Basic Blue 66, Basic Blue 75, Basic Blue 159, small molecule dyes selected from the group consisting of Colour Index (Society of Dyers and Colourists, Bradford, UK) numbers Acid Violet 17, Acid Violet 43, Acid Red 52, Acid Red 73, Acid Red 88, Acid Red 150, Acid Blue 25, Acid Blue 29, Acid Blue 45, Acid Blue 113, Acid Black 1, Direct Blue 1, Direct Blue 71. Direct Violet small molecule dyes may be preferred. Dyes selected from the group consisting Acid Violet 17, Direct Blue 71, Direct Violet 51, Direct Blue 1, Acid Red 88, Acid Red 150, Acid Blue 29, Acid Blue 113 and mixtures thereof may be preferred.

Suitable polymeric dyes include polymeric dyes selected from the group consisting of polymers containing covalently bound chromogens (dye-polymer conjugates) and polymers with chromogens co-polymerized into the backbone of the polymer and mixtures thereof, and polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® (Milliken, Spartanburg, S.C., USA) Violet CT, carboxymethyl cellulose (CMC) conjugated with a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof. Preferred additional hueing dyes include the whitening agents found in WO 08/87497 A1. These whitening agents may be characterized by the following structure (IV):

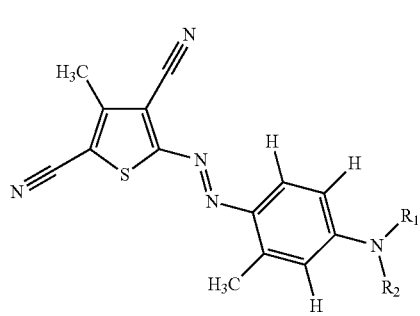

wherein $R_1$ and $R_2$ can independently be selected from:
a) $[(CH_2CR'HO)_x(CH_2CR''HO)_yH]$, wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein x+y≤5; wherein y≥1; and wherein z=0 to 5;
b) $R_1$=alkyl, aryl or aryl alkyl and $R_2$=$[CH_2CR'HO)_x(CH_2CR''HO)_yH]$
wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein x+y≤10; wherein y≥1; and wherein z=0 to 5;
c) $R_1$=$[CH_2CH(OR_3)CH_2OR_4]$ and $R_2$=$[CH_2CH(OR_3)CH_2OR_4]$ wherein $R_3$ is selected from the group consisting of H, $(CH_2CH_2O)_zH$, and mixtures thereof; and wherein z=0 to 10;
wherein $R_4$ is selected from the group consisting of $(C_1$-$C_{16})$alkyl, aryl groups, and mixtures thereof; and
d) wherein R1 and R2 can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

A preferred additional fabric hueing agent which may be incorporated into the compositions of the invention may be characterized by the following structure (IV):

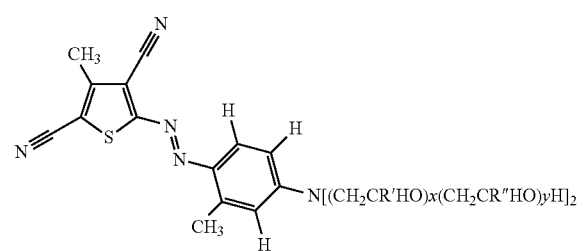

wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein x+y≤5; wherein y≥1; and wherein z=0 to 5.

A further preferred additional hueing dye may be characterized by the following structure (V):

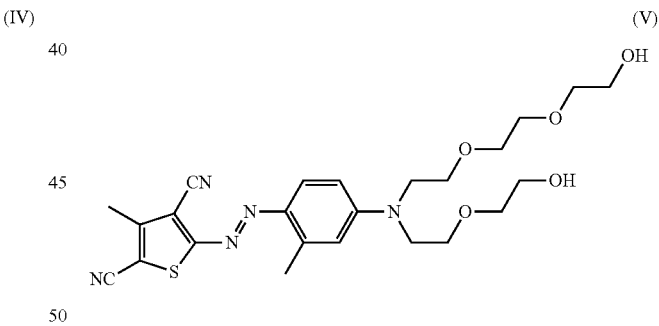

This dye is typically a mixture of compounds having an average of 3-10 Et) groups, preferably 5 Et) groups per molecule.

Further additional shading dyes are those described in USPN 2008 34511 A1 (Unilever). A preferred agent is "Solvent Violet 13".

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by $C_1$-$C_3$-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof. Particularly preferred are Pigment Blues 15 to 20, especially Pigment Blue 15 and/or 16. Other suitable pigments include those selected from the group consisting of Ultramarine Blue (C.I. Pigment Blue 29), Ultramarine Violet (C.I. Pigment Violet 15) and mixtures thereof. Suitable hueing agents are described in more detail in U.S. Pat. No. 7,208,459 B2.

Encapsulates:

The composition may comprise an encapsulate. In one aspect, an encapsulate comprising a core, a shell having an inner and outer surface, said shell encapsulating said core. The core may comprise any laundry care ingredient, though typically the core may comprise material selected from the group consisting of perfumes; brighteners; dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyureas, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof. Preferred encapsulates comprise perfume. Preferred encapsulates comprise a shell which may comprise melamine formaldehyde and/or cross linked melamine formaldehyde.

Preferred encapsulates comprise a core material and a shell, said shell at least partially surrounding said core material, is disclosed. At least 75%, 85% or even 90% of said encapsulates may have a fracture strength of from 0.2 MPa to 10 MPa, and a benefit agent leakage of from 0% to 20%, or even less than 10% or 5% based on total initial encapsulated benefit agent. Preferred are those in which at least 75%, 85% or even 90% of said encapsulates may have (i) a particle size of from 1 microns to 80 microns, 5 microns to 60 microns, from 10 microns to 50 microns, or even from 15 microns to 40 microns, and/or (ii) at least 75%, 85% or even 90% of said encapsulates may have a particle wall thickness of from 30 nm to 250 nm, from 80 nm to 180 nm, or even from 100 nm to 160 nm. Formaldehyde scavengers may be employed with the encapsulates, for example, in a capsule slurry and/or added to a composition before, during or after the encapsulates are added to such composition. Suitable capsules that can be made by following the teaching of USPA 2008/0305982 A1; and/or USPA 2009/0247449 A1. Alternatively, suitable capsules can be purchased from Appleton Papers Inc. of Appleton, Wis. USA.

In a preferred aspect the composition may comprise a deposition aid, preferably in addition to encapsulates. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Preferably, the composition comprises a perfume microcapsule having a D[4,3] average particle size of from about 0.01 micrometers to about 200 micrometers.

Perfume:

Preferred compositions of the invention comprise perfume. Typically the composition comprises a perfume that comprises one or more perfume raw materials, selected from the group as described in WO08/87497. However, any perfume useful in a laundry care composition may be used. A preferred method of incorporating perfume into the compositions of the invention is via an encapsulated perfume particle comprising either a water-soluble hydroxylic compound or melamine-formaldehyde or modified polyvinyl alcohol. In one aspect the encapsulate comprises (a) an at least partially water-soluble solid matrix comprising one or more water-soluble hydroxylic compounds, preferably starch; and (b) a perfume oil encapsulated by the solid matrix. In a further aspect the perfume may be pre-complexed with a polyamine, preferably a polyethylenimine so as to form a Schiff base.

Polymers:

The composition may comprise one or more polymers. Examples are optionally modified carboxymethylcellulose, poly(vinyl-pyrrolidone), poly(ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers.

The composition may comprise one or more amphiphilic cleaning polymers such as the compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n=from 20 to 30, and x=from 3 to 8, or sulphated or sulphonated variants thereof. In one aspect, this polymer is sulphated or sulphonated to provide a zwitterionic soil suspension polymer.

The composition preferably comprises amphiphilic alkoxylated grease cleaning polymers which have balanced hydrophilic and hydrophobic properties such that they remove grease particles from fabrics and surfaces. Preferred amphiphilic alkoxylated grease cleaning polymers comprise a core structure and a plurality of alkoxylate groups attached to that core structure. These may comprise alkoxylated polyalkylenimines, preferably having an inner polyethylene oxide block and an outer polypropylene oxide block. Typically these may be incorporated into the compositions of the invention in amounts of from 0.005 to 10 wt %, generally from 0.5 to 8 wt %.

Alkoxylated polycarboxylates such as those prepared from polyacrylates are useful herein to provide additional grease removal performance. Such materials are described in WO 91/08281 and PCT 90/01815. Chemically, these materials comprise polyacrylates having one ethoxy side-chain per every 7-8 acrylate units. The side-chains are of the formula —$(CH_2CH_2O)_m$ $(CH_2)_nCH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Mixtures of co-surfactants and other adjunct ingredients, are particularly suited to be used with an amphiphilic graft co-polymer. Preferred amphiphilic graft co-polymer(s) comprise (i) polyethyelene glycol backbone; and (ii) and at least one pendant moiety selected from polyvinyl acetate, polyvinyl alcohol and mixtures thereof. A preferred amphiphilic graft co-polymer is Sokalan HP22, supplied from BASF. Suitable polymers include random graft copolymers, preferably a a polyvinyl acetate grafted polyethylene oxide copolymer having a polyethylene oxide backbone and multiple polyvinyl acetate side chains. The molecular weight of the polyethylene oxide backbone is preferably about 6000 and the weight ratio of the polyethylene oxide to polyvinyl acetate is about 40 to 60 and no more than 1 grafting point per 50 ethylene oxide units. Typically these are incorporated into the compositions of the invention in amounts from 0.005 to 10 wt %, more usually from 0.05 to 8 wt %. Preferably the composition comprises one or more carboxylate polymer, such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da. Typically these are incorporated into the compositions of the invention in amounts from 0.005 to 10 wt %, or from 0.05 to 8 wt %.

Preferably the composition comprises one or more soil release polymers. Examples include soil release polymers having a structure as defined by one of the following Formulae (VI), (VII) or (VIII):

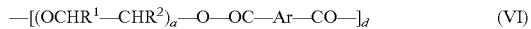  (VI)

  (VII)

  (VIII)

wherein:
a, b and c are from 1 to 200;
d, e and f are from 1 to 50;
Ar is a 1,4-substituted phenylene;
sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Preferably the composition comprises one or more cellulosic polymer, including those selected from alkyl cellulose, alkyl alkoxyalkyl cellulose, carboxyalkyl cellulose, alkyl carboxyalkyl cellulose. Preferred cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da.

Enzymes:

Preferably the composition comprises one or more enzymes. Preferred enzymes provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in the composition, the aforementioned additional enzymes may be present at levels from about 0.00001% to about 2%, from about 0.0001% to about 1% or even from about 0.001% to about 0.5% enzyme protein by weight of the composition.

Proteases:

Preferably the composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from Bacillus, such as Bacillus lentus, B. alkalophilus, B. subtilis, B. amyloliquefaciens, Bacillus pumilus and Bacillus gibsonii described in U.S. Pat. Nos. 6,312,936 B1, 5,679, 630, 4,760,025, 7,262,042 and WO09/021867.

(b) trypsin-type or chymotrypsin-type proteases, such as trypsin (e.g., of porcine or bovine origin), including the Fusarium protease described in WO 89/06270 and the chymotrypsin proteases derived from *Cellumonas* described in WO 05/052161 and WO 05/052146.

(c) metalloproteases, including those derived from *Bacillus amyloliquefaciens* described in WO 07/044993A2.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Amylases:

Preferably the composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis*, *Bacillus amyloliquefaciens*, *Bacillus stearothermophilus*, *Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants described in WO 94/02597, WO 94/18314, WO96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643:

26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus Stearophermophilus* or a truncated version thereof.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

Lipases:

Preferably the invention comprises one or more lipases, including "first cycle lipases" such as those described in U.S. Pat. No. 6,939,702 B1 and US PA 2009/0217464. Preferred lipases are first-wash lipases. In one embodiment of the invention the composition comprises a first wash lipase. First wash lipases includes a lipase which is a polypeptide having an amino acid sequence which: (a) has at least 90% identity with the wild-type lipase derived from *Humicola lanuginosa* strain DSM 4109; (b) compared to said wild-type lipase, comprises a substitution of an electrically neutral or negatively charged amino acid at the surface of the three-dimensional structure within 15A of E1 or Q249 with a positively charged amino acid; and (c) comprises a peptide addition at the C-terminal; and/or (d) comprises a peptide addition at the N-terminal and/or (e) meets the following limitations: i) comprises a negative amino acid in position E210 of said wild-type lipase; ii) comprises a negatively charged amino acid in the region corresponding to positions 90-101 of said wild-type lipase; and iii) comprises a neutral or negative amino acid at a position corresponding to N94 or said wild-type lipase and/or has a negative or neutral net electric charge in the region corresponding to positions 90-101 of said wild-type lipase. Preferred are variants of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred lipases would include those sold under the tradenames Lipex® and Lipolex® and Lipoclean®.

Endoglucanases:

Other preferred enzymes include microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean® and Whitezyme® (Novozymes A/S, Bagsvaerd, Denmark).

Pectate Lyases:

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, Calif.).

Bleaching Agents:

It may be preferred for the composition to comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent or mixtures of bleaching agents by weight of the subject composition. Examples of suitable bleaching agents include:

(1) photobleaches: for example sulfonated zinc phthalocyanine sulfonated aluminium phthalocyanines, xanthene dyes and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, Oxone®, and mixtures thereof. Suitable examples include peroxycarboxylic acids or salts thereof, or peroxysulphonic acids or salts thereof. Typical peroxycarboxylic acid salts suitable for use herein have a chemical structure corresponding to the following chemical formula:

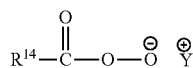

wherein: $R^{14}$ is selected from alkyl, aralkyl, cycloalkyl, aryl or heterocyclic groups; the $R^{14}$ group can be linear or branched, substituted or unsubstituted; having, when the peracid is hydrophobic, from 6 to 14 carbon atoms, or from 8 to 12 carbon atoms and, when the peracid is hydrophilic, less than 6 carbon atoms or even less than 4 carbon atoms and Y is any suitable counter-ion that achieves electric charge neutrality, preferably Y is selected from hydrogen, sodium or potassium. Preferably, $R^{14}$ is a linear or branched, substituted or unsubstituted $C_{6-9}$ alkyl. Preferably, the peroxyacid or salt thereof is selected from peroxyhexanoic acid, peroxyheptanoic acid, peroxyoctanoic acid, peroxynonanoic acid, peroxydecanoic acid, any salt thereof, or any combination thereof. Particularly preferred peroxyacids are phthalimido-peroxy-alkanoic acids, in particular ε-phthalimido peroxy hexanoic acid (PAP). Preferably, the peroxyacid or salt thereof has a melting point in the range of from 30° C. to 60° C.

The pre-formed peroxyacid or salt thereof can also be a peroxysulphonic acid or salt thereof, typically having a chemical structure corresponding to the following chemical formula:

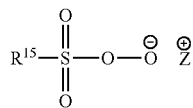

wherein: $R^{15}$ is selected from alkyl, aralkyl, cycloalkyl, aryl or heterocyclic groups; the $R^{15}$ group can be linear or branched, substituted or unsubstituted; and Z is any suitable counter-ion that achieves electric charge neutrality, preferably Z is selected from hydrogen, sodium or potassium. Preferably $R^{15}$ is a linear or branched, substituted or unsubstituted $C_{4-14}$, preferably $C_{6-14}$ alkyl. Preferably such bleach components may be present in the compositions of the invention in an amount from 0.01 to 50%, most preferably from 0.1% to 20%.

(3) sources of hydrogen peroxide: for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators: suitably R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject composition may comprise NOBS, TAED or mixtures thereof.

(5) Bleach Catalysts: The compositions of the present invention may also include one or more bleach catalysts capable of accepting an oxygen atom from a peroxyacid and/or salt thereof, and transferring the oxygen atom to an oxidizable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and alpha amino-ketones and mixtures thereof. Suitable alpha amino ketones are for example as described in WO 2012/000846 A1, WO 2008/015443 A1, and WO 2008/014965 A1. Suitable mixtures are as described in USPA 2007/0173430 A1.

Without wishing to be bound by theory, the inventors believe that controlling the electophilicity and hydrophobicity in this above described manner enables the bleach ingredient to be delivered substantially only to areas of the fabric that are more hydrophobic, and that contain electron rich soils, including visible chromophores, that are susceptible to bleaching by highly electrophilic oxidants.

In one aspect, the bleach catalyst has a structure corresponding to general formula below:

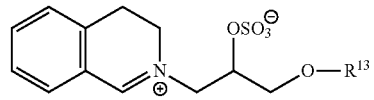

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl;

(6) Catalytic metal complexes: The composition may preferably comprise catalytic metal complexes. One preferred type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

When present, the source of hydrogen peroxide/peracid and/or bleach activator is generally present in the composition in an amount of from about 0.1 to about 60 wt %, from about 0.5 to about 40 wt % or even from about 0.6 to about 10 wt % based on the fabric and home care product. One or more hydrophobic peracids or precursors thereof may be used in combination with one or more hydrophilic peracid or precursor thereof.

Typically hydrogen peroxide source and bleach activator will be incorporated together. The amounts of hydrogen peroxide source and peracid or bleach activator may be selected such that the molar ratio of available oxygen (from the peroxide source) to peracid is from 1:1 to 35:1, or even 2:1 to 10:1.

Surfactant:

Preferably the composition comprises a surfactant or surfactant system. The surfactant can be selected from nonionic, anionic, cationic, amphoteric, ampholytic, amphiphilic, zwitterionic, semi-polar nonionic surfactants and mixtures thereof. Preferred compositions comprise a mixture of surfactants/surfactant system. Preferred surfactant systems comprise one or more anionic surfactants, most preferably in combination with a co-surfactant, most preferably a nonionic and/or amphoteric and/or zwitterionic surfactant. Preferred surfactant systems comprise both anionic and nonionic surfactant, preferably in weight ratios from 90:1 to 1:90. In some instances a weight ratio of anionic to nonionic surfactant of at least 1:1 is preferred. However a ratio below 10:1 may be preferred. When present, the total surfactant level is preferably from 0.1% to 60%, from 1% to 50% or even from 5% to 40% by weight of the subject composition.

Preferably the composition comprises an anionic detersive surfactant, preferably sulphate and/or sulphonate surfactants. Preferred examples include alkyl benzene sulphonates, alkyl sulphates and alkyl alkoxylated sulphates. Preferred sulphonates are $C_{10-13}$ alkyl benzene sulphonate. Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

Preferred sulphate detersive surfactants include alkyl sulphate, typically $C_{8-18}$ alkyl sulphate, or predominantly $C_{12}$ alkyl sulphate. A further preferred alkyl sulphate is alkyl alkoxylated sulphate, preferably a $C_{8-18}$ alkyl alkoxylated sulphate. Preferably the alkoxylating group is an ethoxylating group. Typically the alkyl alkoxylated sulphate has an average degree of alkoxylation of from 0.5 to 30 or 20, or from 0.5 to 10. Particularly preferred are $C_{8-18}$ alkyl ethoxylated sulphate having an average degree of ethoxylation of from 0.5 to 10, from 0.5 to 7, from 0.5 to 5 or even from 0.5 to 3.

The alkyl sulphate, alkyl alkoxylated sulphate and alkyl benzene sulphonates may be linear or branched, substituted or un-substituted. When the surfactant is branched, preferably the surfactant will comprise a mid-chain branched sulphate or sulphonate surfactant. Preferably the branching groups comprise $C_{1-4}$ alkyl groups, typically methyl and/or ethyl groups.

Preferably the composition comprises a nonionic detersive surfactant. Suitable non-ionic surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein the alkoxylate units may be ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, in one aspect, alkylpolyglycosides; polyhydroxy fatty acid amides; ether capped poly (oxyalkylated) alcohol surfactants; and mixtures thereof.

Suitable non-ionic detersive surfactants include alkyl polyglucoside and/or an alkyl alkoxylated alcohol.

In one aspect, non-ionic detersive surfactants include alkyl alkoxylated alcohols, in one aspect $C_{8-18}$ alkyl alkoxylated alcohol, for example a $C_{8-18}$ alkyl ethoxylated alcohol, the alkyl alkoxylated alcohol may have an average degree of alkoxylation of from 1 to 80, preferably from 1 to 50, most preferably from 1 to 30, from 1 to 20, or from 1 to 10. In one aspect, the alkyl alkoxylated alcohol may be a $C_{8-18}$ alkyl ethoxylated alcohol having an average degree of ethoxylation of from 1 to 10, from 1 to 7, more from 1 to 5 or from 3 to 7, or even below 3 or 2. The alkyl alkoxylated alcohol can be linear or branched, and substituted or un-substituted.

Suitable nonionic surfactants include those with the tradename Lutensol® from BASF.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

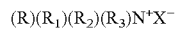

$(R)(R_1)(R_2)(R_3)N^+X^-$ wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Suitable amphoteric/zwitterionic surfactants include amine oxides and betaines.

Amine-neutralized anionic surfactants—Anionic surfactants of the present invention and adjunct anionic cosurfactants, may exist in an acid form, and said acid form may be neutralized to form a surfactant salt which is desirable for use in the present detergent compositions. Typical agents for neutralization include the metal counterion base such as hydroxides, eg, NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Builders:

Preferably the composition comprises one or more builders or a builder system. When a builder is used, the composition of the invention will typically comprise at least 1%, preferably from 2% to 60% builder. It may be preferred that the composition comprises low levels of phosphate salt and/or zeolite, for example from 1 to 10 or 5 wt %. The composition may even be substantially free of strong builder; substantially free of strong builder means "no deliberately added" zeolite and/or phosphate. Typical zeolite builders include zeolite A, zeolite P and zeolite MAP. A typical phosphate builder is sodium tri-polyphosphate.

Chelating Agent:

Preferably the composition comprises chelating agents and/or crystal growth inhibitor. Suitable molecules include copper, iron and/or manganese chelating agents and mixtures thereof. Suitable molecules include aminocarboxylates, aminophosphonates, succinates, salts thereof, and mixtures thereof. Non-limiting examples of suitable chelants for use herein include ethylenediaminetetracetates, N-(hydroxyethyl)ethylenediaminetriacetates, nitrilotriacetates, ethylenediamine tetraproprionates, triethylenetetraaminehexacetates, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), salts thereof, and mixtures thereof. Other nonlimiting examples of chelants of use in the present invention are found in U.S. Pat. Nos. 7,445,644, 7,585,376 and 2009/0176684A1. Other suitable chelating agents for use herein are the commercial DEQUEST series, and chelants from Monsanto, DuPont, and Nalco, Inc.

Dye Transfer Inhibitor (DTI):

The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Fluorescent Brightener:

Preferably the composition comprises one or more fluorescent brightener. Commercial optical brighteners which may be useful in the present invention can be classified into subgroups, which include, but are not limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Particularly preferred brighteners are selected from: sodium 2(4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2-disulfonate, disodium 4,4'-bis{[(4-anilino-6-morpholino-1,3,5-triazin-2-yl)]amino}stilbene-2-2' disulfonate, and disodium 4,4'-bis(2-sulfostyryl) biphenyl. Other examples of such brighteners are disclosed in "The Production and Application of Fluorescent Brightening Agents", M. Zahradnik, Published by John Wiley & Sons, New York (1982). Specific nonlimiting examples of optical brighteners which are useful in the present compositions are those identified in U.S. Pat. Nos. 4,790,856 and 3,646,015.

A preferred brightener has the structure below:

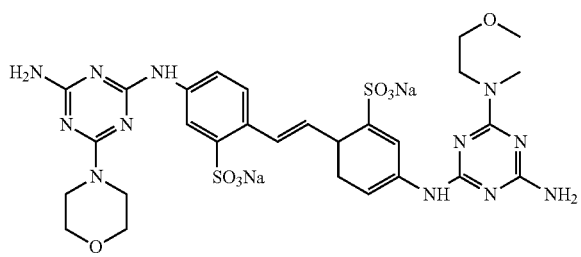

Suitable fluorescent brightener levels include lower levels of from about 0.01, from about 0.05, from about 0.1 or even from about 0.2 wt % to upper levels of 0.5 or even 0.75 wt %.

In one aspect the brightener may be loaded onto a clay to form a particle.

Preferred brighteners are totally or predominantly (typically at least 50 wt %, at least 75 wt %, at least 90 wt %, at least 99 wt %), in alpha-crystalline form. A highly preferred brightener comprises C.I. fluorescent brightener 260, preferably having the following structure:

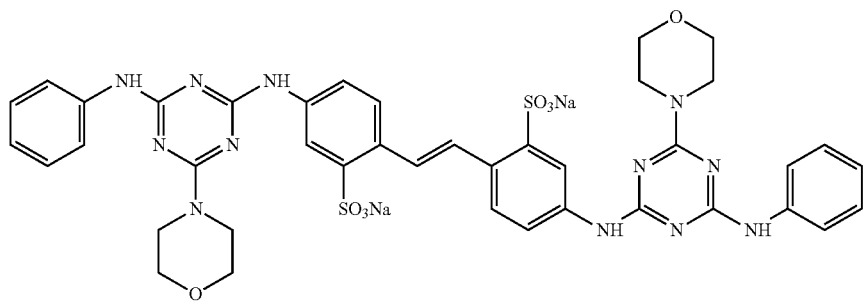

This can be particularly useful as it dissolves well in cold water, for example below 30 or 25 or even 20° C.

Preferably brighteners are incorporated in the composition in micronized particulate form, most preferably having a weight average primary particle size of from 3 to 30 micrometers, from 3 micrometers to 20 micrometers, or from 3 to 10 micrometers.

The composition may comprise C.I. fluorescent brightener 260 in beta-crystalline form, and the weight ratio of: (i) C.I. fluorescent brightener 260 in alpha-crystalline form, to (ii) C.I. fluorescent brightener 260 in beta-crystalline form may be at least 0.1, or at least 0.6.

BE680847 relates to a process for making C.I fluorescent brightener 260 in alpha-crystalline form.

Silicate Salts:

The composition may preferably also contain silicate salts, such as sodium or potassium silicate. The composition may comprise from 0 wt % to less than 10 wt % silicate salt, to 9 wt %, or to 8 wt %, or to 7 wt %, or to 6 wt %, or to 5 wt %, or to 4 wt %, or to 3 wt %, or even to 2 wt %, and preferably from above 0 wt %, or from 0.5 wt %, or even from 1 wt % silicate salt. A suitable silicate salt is sodium silicate.

Dispersants:

The composition may preferably also contain dispersants. Suitable water-soluble organic materials include the homo- or co-polymeric acids or their salts, in which the polycarboxylic acid comprises at least two carboxyl radicals separated from each other by not more than two carbon atoms.

Enzyme Stabilisers:

The composition may preferably comprise enzyme stabilizers. Any conventional enzyme stabilizer may be used, for example by the presence of water-soluble sources of calcium and/or magnesium ions in the finished fabric and home care products that provide such ions to the enzymes. In case of aqueous compositions comprising protease, a reversible protease inhibitor, such as a boron compound including borate, or preferably 4-formyl phenylboronic acid, phenylboronic acid and derivatives thereof, or compounds such as calcium formate, sodium formate and 1,2-propane diol can be added to further improve stability.

Solvent System:

The solvent system in the present compositions can be a solvent system containing water alone or mixtures of organic solvents either without or preferably with water. Preferred organic solvents include 1,2-propanediol, ethanol, glycerol, dipropylene glycol, methyl propane diol and mixtures thereof. Other lower alcohols, C1-C4 alkanolamines such as monoethanolamine and triethanolamine, can also be used. Solvent systems can be absent, for example from anhydrous solid embodiments of the invention, but more typically are present at levels in the range of from about 0.1% to about 98%, preferably at least about 1% to about 50%, more usually from about 5% to about 25%.

In some embodiments of the invention, the composition is in the form of a structured liquid. Such structured liquids can either be internally structured, whereby the structure is formed by primary ingredients (e.g. surfactant material) and/or externally structured by providing a three dimensional matrix structure using secondary ingredients (e.g. polymers, clay and/or silicate material), for use e.g. as thickeners. The composition may comprise a structurant, preferably from 0.01 wt % to 5 wt %, from 0.1 wt % to 2.0 wt % structurant. Examples of suitable structurants are given in US2006/0205631A1, US2005/0203213A1, U.S. Pat. Nos. 7,294,611, 6,855,680. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, hydrogenated castor oil, derivatives of hydrogenated castor oil such as non-ethoxylated derivatives thereof and mixtures thereof, in particular, those selected from the group of hydrogenated castor oil, derivatives of hydrogenated castor oil, microfibullar cellulose, hydroxyfunctional crystalline materials, long chain fatty alcohols, 12-hydroxystearic acids, clays and mixtures thereof. A preferred structurant is described in U.S. Pat. No. 6,855,680 which defines suitable hydroxyfunctional crystalline materials in detail. Preferred is hydrogenated castor oil. Non-limiting examples of useful structurants include. Such structurants have a thread-like structuring system having a range of aspect ratios. Other suitable structurants and the processes for making them are described in WO2010/034736.

The composition of the present invention may comprise a high melting point fatty compound. The high melting point fatty compound useful herein has a melting point of 25° C. or higher, and is selected from the group consisting of fatty alcohols, fatty acids, fatty alcohol derivatives, fatty acid derivatives, and mixtures thereof. Such compounds of low melting point are not intended to be included in this section. Non-limiting examples of the high melting point compounds are found in International Cosmetic Ingredient Dictionary, Fifth Edition, 1993, and CTFA Cosmetic Ingredient Handbook, Second Edition, 1992. When present, the high melting point fatty compound is preferably included in the composition at a level of from 0.1% to 40%, preferably from 1% to 30%, more preferably from 1.5% to 16% by weight of the composition, from 1.5% to 8% in view of providing improved conditioning benefits such as slippery feel during the application to wet hair, softness and moisturized feel on dry hair.

The composition may comprises no more than 20 wt % water; preferably no more than 15 wt % water; preferably no more than 10 wt % water; or even more preferably no more than 5 wt % water, and the composition preferably comprises from 10 wt % to 70 wt % of a water-miscible organic solvent having a molecular weight of greater than 70 Daltons.

Cationic Polymer:

The compositions of the present invention may contain a cationic polymer. Concentrations of the cationic polymer in the composition typically range from 0.05% to 3%, in another embodiment from 0.075% to 2.0%, and in yet another embodiment from 0.1% to 1.0%. Suitable cationic polymers will have cationic charge densities of at least 0.5 meq/gm, in another embodiment at least 0.9 meq/gm, in another embodiment at least 1.2 meq/gm, in yet another embodiment at least 1.5 meq/gm, but in one embodiment also less than 7 meq/gm, and in another embodiment less than 5 meq/gm, at the pH of intended use of the composition, which pH will generally range from pH 3 to pH 9, in one embodiment between pH 4 and pH 8. Herein, "cationic charge density" of a polymer refers to the ratio of the number of positive charges on the polymer to the molecular weight of the polymer. The average molecular weight of such suitable cationic polymers will generally be between 10,000 and 10 million, in one embodiment between 50,000 and 5 million, and in another embodiment between 100,000 and 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

Suitable cationic polymers are described in U.S. Pat. Nos. 3,962,418; 3,958,581; and U.S. Publication No. 2007/0207109A1.

Nonionic Polymer:

The composition of the present invention may include a nonionic polymer as a conditioning agent. Polyalkylene glycols having a molecular weight of more than 1000 are useful herein. Useful are those having the following general formula:

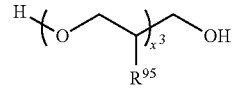

wherein R95 is selected from the group consisting of H, methyl, and mixtures thereof. Conditioning agents, and in particular silicones, may be included in the composition. The conditioning agents useful in the compositions of the present invention typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. Such conditioning agents should be physically and chemically compatible with the essential components of the composition, and should not otherwise unduly impair product stability, aesthetics or performance.

The concentration of the conditioning agent in the composition should be sufficient to provide the desired conditioning benefits. Such concentration can vary with the conditioning agent, the conditioning performance desired, the average size of the conditioning agent particles, the type and concentration of other components, and other like factors.

The concentration of the silicone conditioning agent typically ranges from about 0.01% to about 10%. Non-limiting examples of suitable silicone conditioning agents, and optional suspending agents for the silicone, are described in U.S. Reissue Pat. No. 34,584, U.S. Pat. Nos. 5,104,646; 5,106,609; 4,152,416; 2,826,551; 3,964,500; 4,364,837; 6,607,717; 6,482,969; 5,807,956; 5,981,681; 6,207,782; 7,465,439; 7,041,767; 7,217,777; US Patent Application Nos. 2007/0286837A1; 2005/0048549A1; 2007/0041929A1; British Pat. No. 849,433; German Patent No. DE 10036533, which are all incorporated herein by reference; Chemistry and Technology of Silicones, New York: Academic Press (1968); General Electric Silicone Rubber Product Data Sheets SE 30, SE 33, SE 54 and SE 76; Silicon Compounds, Petrarch Systems, Inc. (1984); and in Encyclopedia of Polymer Science and Engineering, vol. 15, 2d ed., pp 204-308, John Wiley & Sons, Inc. (1989).

Organic Conditioning Oil:

The compositions of the present invention may also comprise from about 0.05% to about 3% of at least one organic conditioning oil as the conditioning agent, either alone or in combination with other conditioning agents, such as the silicones (described herein). Suitable conditioning oils include hydrocarbon oils, polyolefins, and fatty esters. Also suitable for use in the compositions herein are the conditioning agents described by the Procter & Gamble Company in U.S. Pat. Nos. 5,674,478, and 5,750,122. Also suitable for use herein are those conditioning agents described in U.S. Pat. Nos. 4,529,586, 4,507,280, 4,663,158, 4,197,865, 4,217,914, 4,381,919, and 4,422,853.

Hygiene Agent:

The compositions of the present invention may also comprise components to deliver hygiene and/or malodour benefits such as one or more of zinc ricinoleate, thymol, quaternary ammonium salts such as Bardac®, polyethylenimines (such as Lupasol® from BASF) and zinc complexes thereof, silver and silver compounds, especially those designed to slowly release Ag+ or nano-silver dispersions.

Probiotics:

The composition may comprise probiotics, such as those described in WO2009/043709.

Suds Boosters:

The composition may preferably comprise suds boosters if high sudsing is desired. Suitable examples are the C10-C16 alkanolamides or C10-C14 alkyl sulphates, which are preferably incorporated at 1%-10% levels. The C10-C14 monoethanol and diethanol amides illustrate a typical class of such suds boosters. Use of such suds boosters with high sudsing adjunct surfactants such as the amine oxides, betaines and sultaines noted above is also advantageous. If desired, water-soluble magnesium and/or calcium salts such as MgCl2, MgSO4, CaCl2, CaSO4 and the like, can be added at levels of, typically, 0.1%-2%, to provide additional suds and to enhance grease removal performance.

Suds Supressor:

Compounds for reducing or suppressing the formation of suds may be incorporated into the compositions of the present invention. Suds suppression can be of particular importance in the so-called "high concentration cleaning process" as described in U.S. Pat. Nos. 4,489,455 and 4,489,574, and in front-loading-style washing machines. A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds supressors include monocarboxylic fatty acid and soluble salts therein, high molecular weight hydrocarbons such as paraffin, fatty acid esters (e.g., fatty acid triglycerides), fatty acid esters of monovalent alcohols, aliphatic C18-C40 ketones (e.g., stearone), N-alkylated amino triazines, waxy hydrocarbons preferably having a melting point below about 100° C., silicone suds suppressors, and secondary alcohols. Suds supressors are described in U.S. Pat. Nos. 2,954,347; 4,265,779; 4,265,779; 3,455,839; 3,933,672; 4,652,392; 4,978,471; 4,983,316; 5,288,431; 4,639,489; 4,749,740; and 4,798,679; 4,075,118; European Patent Application No. 89307851.9; EP 150,872; and DOS 2,124,526.

For any detergent compositions to be used in automatic laundry washing machines, suds should not form to the extent that they overflow the washing machine. Suds suppressors, when utilized, are preferably present in a "suds suppressing amount". By "suds suppressing amount" is meant that the formulator of the composition can select an amount of this suds controlling agent that will sufficiently control the suds to result in a low-sudsing laundry detergent for use in automatic laundry washing machines. The compositions herein will generally comprise from 0% to 10% of suds suppressor. When utilized as suds suppressors, monocarboxylic fatty acids, and salts therein, will be present typically in amounts up to 5%, by weight, of the detergent composition. Preferably, from 0.5% to 3% of fatty monocarboxylate suds suppressor is utilized. Silicone suds suppressors are typically utilized in amounts up to 2.0%, by weight, of the detergent composition, although higher amounts may be used. Monostearyl phosphate suds suppressors are generally utilized in amounts ranging from 0.1% to 2%, by weight, of the composition. Hydrocarbon suds suppressors are typically utilized in amounts ranging from 0.01% to 5.0%, although higher levels can be used. The alcohol suds suppressors are typically used at 0.2%-3% by weight of the finished compositions.

Pearlescent Agents:

Pearlescent agents as described in WO2011/163457 may be incorporated into the compositions of the invention.

Perfume:

Preferably the composition comprises a perfume, preferably in the range from 0.001 to 3 wt %, most preferably from 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory $80^{th}$ Annual Edition, published by Schnell Publishing Co. It is usual for a plurality of perfume components to be present in the compositions of the invention, for example four, five, six, seven or more. In perfume mixtures preferably 15 to 25 wt % are top notes. Top notes are defined by Poucher (Journal of the Society of Cosmetic Chemists 6(2):80 [1995]). Preferred top notes include rose oxide, citrus oils, linalyl acetate, lavender, linalool, dihydromyrcenol and cis-3-hexanol.

Packaging:

Any conventional packaging may be used and the packaging may be fully or partially transparent so that the consumer can see the colour of the product which may be provided or contributed to by the colour of the dyes essential to the invention. UV absorbing compounds may be included in some or all of the packaging.

Process of Making Compositions:

The compositions of the invention may be in any useful form, as described above. They may be made by any process chosen by the formulator, non-limiting examples of which are described in the examples and in U.S. Pat. No. 4,990,280; U.S. 20030087791A1; U.S. 20030087790A1; U.S. 20050003983A1; U.S. 20040048764A1; U.S. Pat. Nos. 4,762,636; 6,291,412; U.S. 20050227891A1; EP 1070115A2; U.S. Pat. Nos. 5,879,584; 5,691,297; 5,574,005; 5,569,645; 5,565,422; 5,516,448; 5,489,392; 5,486.

Suitable film for forming the pouches is soluble or dispersible in water, and preferably has a water-solubility/dispersibility of at least 50%, preferably at least 75% or even at least 95%, as measured by the method set out here after using a glass-filter with a maximum pore size of 20 microns:

50 grams±0.1 gram of pouch material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are polymeric materials. The film material can be obtained, for example, by casting, blow-moulding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779 (as described in the Applicants co-pending applications ref 44528 and 11599) and those described in U.S. Pat. Nos. 6,166,117 and 6,787,512 and PVA films of corresponding solubility and deformability characteristics.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

Method of Making Unit Dose Pouches:

The compositions of the invention when in pouch form may be made using any suitable equipment and method. However multi-compartment pouches are preferably made using the horizontal form filling process. The film is preferably wetting, more preferably heated to increase the malleability thereof. Even more preferably, the method also involves the use of a vacuum to draw the film into a suitable mould. The vacuum drawing the film into the mould can be applied for 0.2 to 5 seconds, preferably 0.3 to 3 or even more preferably 0.5 to 1.5 seconds, once the film is on the horizontal portion of the surface. This vacuum may preferably be such that it provides an under-pressure of between −100 mbar to −1000 mbar, or even from −200 mbar to −600 mbar.

The moulds, in which the pouches are made, can have any shape, length, width and depth, depending on the required dimensions of the pouches. The moulds can also vary in size and shape from one to another, if desirable. For example, it may be preferred that the volume of the final pouches is between 5 and 300 ml, or even 10 and 150 ml or even 20 and 100 ml and that the mould sizes are adjusted accordingly.

Heat can be applied to the film, in the process commonly known as thermoforming, by any means. For example the film may be heated directly by passing it under a heating element or through hot air, prior to feeding it onto the surface or once on the surface. Alternatively it may be heated indirectly, for example by heating the surface or applying a hot item onto the film. Most preferably the film is heated using an infra red light. The film is preferably heated to a temperature of 50 to 120° C., or even 60 to 90° C. Alternatively, the film can be wetted by any mean, for example directly by spraying a wetting agent (including water, solutions of the film material or plasticizers for the film material) onto the film, prior to feeding it onto the surface or once on the surface, or indirectly by wetting the surface or by applying a wet item onto the film.

In the case of pouches comprising powders it is advantageous to pin prick the film for a number of reasons: (a) to reduce the possibility of film defects during the pouch formation, for example film defects giving rise to rupture of the film can be generated if the stretching of the film is too fast; (b) to permit the release of any gases derived from the product enclosed in the pouch, as for example oxygen formation in the case of powders containing bleach; and/or (c) to allow the continuous release of perfume. Moreover, when heat and/or wetting is used, pin pricking can be used before, during or after the use of the vacuum, preferably during or before application of the vacuum. Preferred is thus that each mould comprises one or more holes which are connected to a system which can provide a vacuum through these holes, onto the film above the holes, as described herein in more detail.

Once a film has been heated/wetted, it is drawn into an appropriate mould, preferably using a vacuum. The filling of the moulded film can be done by any known method for filling (moving) items. The most preferred method will depend on the product form and speed of filling required. Preferably the moulded film is filled by in-line filling techniques. The filled, open pouches are then closed, using a second film, by any suitable method. Preferably, this is also done while in horizontal position and in continuous, constant motion. Preferably the closing is done by continuously feeding a second material or film, preferably water-soluble film, over and onto the web of open pouches and then preferably sealing the first film and second film together, typically in the area between the moulds and thus between the pouches.

Preferred methods of sealing include heat sealing, solvent welding, and solvent or wet sealing. It is preferred that only the area which is to form the seal, is treated with heat or solvent. The heat or solvent can be applied by any method, preferably on the closing material, preferably only on the areas which are to form the seal. If solvent or wet sealing or welding is used, it may be preferred that heat is also applied. Preferred wet or solvent sealing/welding methods include applying selectively solvent onto the area between the moulds, or on the closing material, by for example, spraying or printing this onto these areas, and then applying pressure onto these areas, to form the seal. Sealing rolls and belts as described above (optionally also providing heat) can be used, for example.

The formed pouches can then be cut by a cutting device. Cutting can be done using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouch may be made together in a side-by-side style and consecutive pouches are not cut. Alternatively, the compartments can be made separately. According to this process and preferred arrangement, the pouches are made according to the process comprising the steps of:
  a) forming an first compartment (as described above);
  b) forming a recess within some or all of the closed compartment formed in step (a), to generate a second moulded compartment superposed above the first compartment;
  c) filling and closing the second compartments by means of a third film;
  d) sealing said first, second and third films; and
  e) cutting the films to produce a multi-compartment pouch.

Said recess formed in step b is preferably achieved by applying a vacuum to the compartment prepared in step a).

Alternatively the second, and optionally third, compartment(s) can be made in a separate step and then combined with the first compartment as described in our co-pending application EP 08101442.5 which is incorporated herein by reference. A particularly preferred process comprises the steps of:
  a) forming a first compartment, optionally using heat and/or vacuum, using a first film on a first forming machine;
  b) filling said first compartment with a first composition;
  c) on a second forming machine, deforming a second film, optionally using heat and vacuum, to make a second and optionally third moulded compartment;
  d) filling the second and optionally third compartments;
  e) sealing the second and optionally third compartment using a third film;
  f) placing the sealed second and optionally third compartments onto the first compartment;
  g) sealing the first, second and optionally third compartments; and
  h) cutting the films to produce a multi-compartment pouch Solid Form:

As noted previously, the laundry care compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the dye is provided in particulate form, optionally including additional but not all components of the laundry detergent composition. The dye particulate is combined with one or more additional particulates containing a balance of components of the laundry detergent composition. Further, the dye, optionally including additional but not all components of the laundry detergent composition, may be provided in an encapsulated form, and the shading dye encapsulate is combined with particulates containing a substantial balance of components of the laundry detergent composition. Suitable pre-mix particles for incorporation of dyes/benefit agents into laundry care compositions of the invention are described for example in WO2010/084039, WO2007/039042, WO2010/022775, WO2009/132870, WO2009/087033, WO2007/006357, WO2007/039042, WO2007/096052, WO2011/020991, WO2006/053598, WO2003/018740 and WO2003/018738.

Typically, the wash liquor is formed by contacting the laundry care composition with wash water in such an amount so that the concentration of the laundry care composition in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric or textile may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water. Typically from 0.01 kg to 2 kg of fabric per liter of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per liter of wash liquor is dosed into said wash liquor. Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Typically the wash liquor comprising the laundry care composition of the invention has a pH of from 3 to 11.5.

In one aspect, such method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings. The fabric may comprise any fabric capable of being laundered in normal consumer or institutional use conditions, and the invention is particularly suitable for synthetic textiles such as polyester and nylon and especially for treatment of mixed fabrics and/or fibres comprising synthetic and cellulosic fabrics and/or fibres. As examples of synthetic fabrics are polyester, nylon, these may be present in mixtures with cellulosic fibres, for example, polycotton fabrics. The solution typically has a pH of from 7 to 11, more usually 8 to 10.5. The compositions are typically employed at concentrations from 500 ppm to 5,000 ppm in solution. The water temperatures typically range from about 5° C. to about 90° C. The water to fabric ratio is typically from about 1:1 to about 30:1.

Method of Treating Textiles:

The present invention also provides a method of treating a cellulosic and/or polyester and/or nylon-comprising textile, the method comprising the steps of:

(i) treating the textile with an aqueous solution comprising a laundry care composition according to any preceding claim, wherein the concentration of thiophene azo carboxylate dye is from about 1 ppb to about 500 ppm, preferably to 100 ppm, or to 25 ppm, or to 10 ppm, or even to 5 ppm;
(ii) optionally rinsing, and
(iii) drying the textile.

EXAMPLES

Example 1

Dye Synthesis
Synthesis of Propylene Amido Coupler 6 and Ethylene Amido Coupler 9.

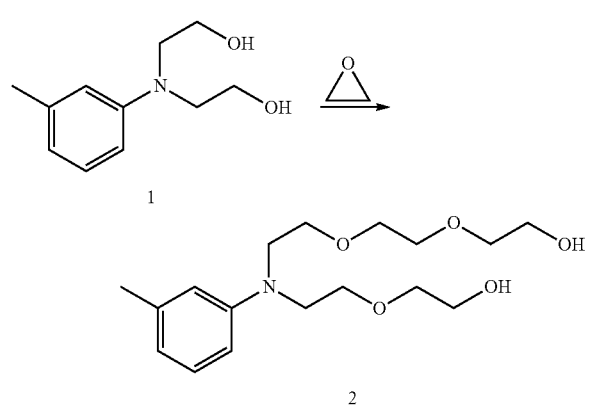

To a solution of 195 g (approximately 1.0 mole) of N,N-Bis(2-hydroxyethyl)-meta-toluidine 1 (available for purchase form TCI America, Portland, Oreg., 97203 USA) in 200 mL of toluene is added 3 g potassium hydroxide. Thereafter 132 g (3.0 moles) of ethylene oxide is charged to the reaction which is allowed to proceed by means of well known ethoxylation procedures. The toluene is removed under reduced pressure to leave the ethoxylated meta-toluidine 2.

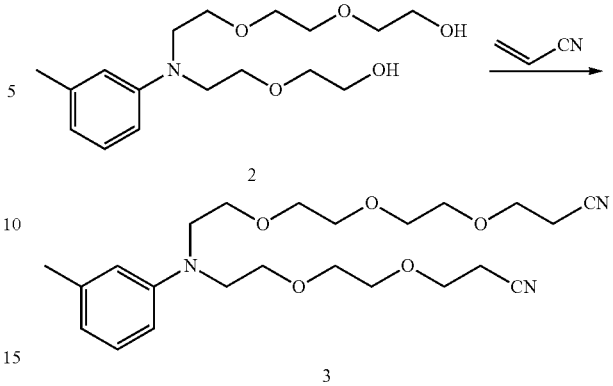

To a 500-mL three-necked flask equipped with a stirrer, 65.5 g (200 mmol) of ethoxylated meta-toluidine 2 and 148.6 g (2.8 mol) of acrylonitrile are added. Then, while cooling in an ice bath, 120 mg of potassium hydroxide are added and the resulting mixture is stirred for 10 hours. The excess acrylonitrile is distilled off under reduced pressure. Thereafter, 600 mL of methylene chloride is added to the residue, and the resulting liquid is filtered and is washed with 400 mL of methylene chloride. The obtained solution is washed with 400 mL of aqueous sodium bicarbonate, and the organic layer is dried over magnesium sulfate. Thereafter, methylene chloride is removed under reduced pressure to obtain the nitrile 3.

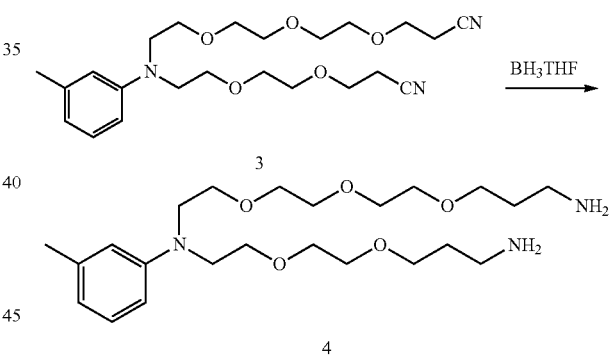

Next, to a two-liter three-necked flask equipped with a stirrer, 85.0 g (196 mmol) of the nitrile 3 and 230 mL of tetrahydrofuran are added. Under a nitrogen atmosphere, 1200 mL (1.2 mol) of a 1 M solution of borane tetrahydrofuran complex is added dropwise over one hour. After the addition is completed, the mixture is stirred and heated under reflux for 5 hours. The resulting mixture is cooled to room temperature and a mixed solution of 350 mL of methanol and 76 mL of concentrated hydrochloric acid is slowly added thereto dropwise and stirred for one hour at room temperature. The organic solvent is removed under reduced pressure. To the obtained solution, 580 mL of a 2 N aqueous solution of sodium hydroxide are added, and the resulting liquid is extracted 3 times with 400 mL of methylene chloride. The obtained organic layer is dried over magnesium sulfate, filtered and the solvent is removed under reduced pressure to obtain the bis-amine coupling precursor 4.

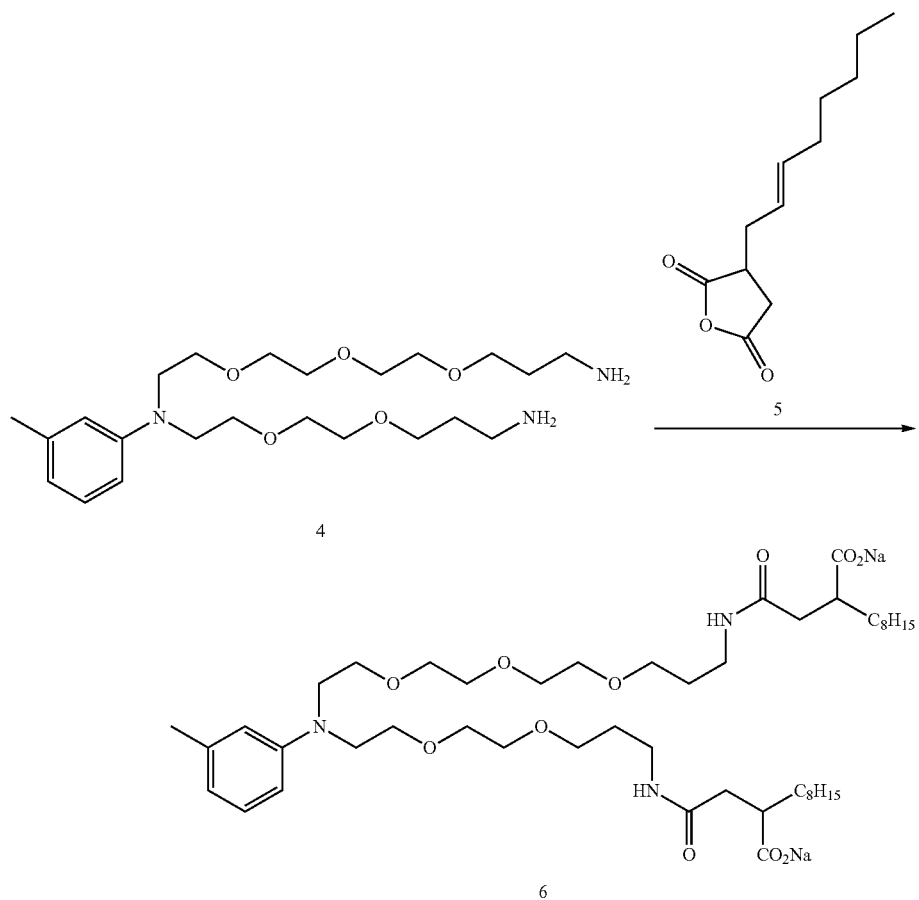

Dihydro-3-(2-octen-1-yl)-2,5-furandione 5 (prepared as described in Example 1 of U.S. Pat. No. 5,512,685 to Jarvinen et al.; 3.74 g, 17.8 mmole) and bis-amine coupling precursor 4 (4.51 g, 10.4 mmol) are weighed in an oven-dried round bottom flask. Pyridine (4.5 ml) is added to the flask and the reaction is allowed to occur at 80° C. for 3 hr. The reaction mixture is cooled, extracted into dichloromethane (DCM, 150 ml) and washed with 10% HCl. The organic phase is separated, dried with sodium sulfate and is concentrated under reduced pressure to obtain the propylene amido coupler 6.

Synthesis of Ethylene Amido Coupler y.

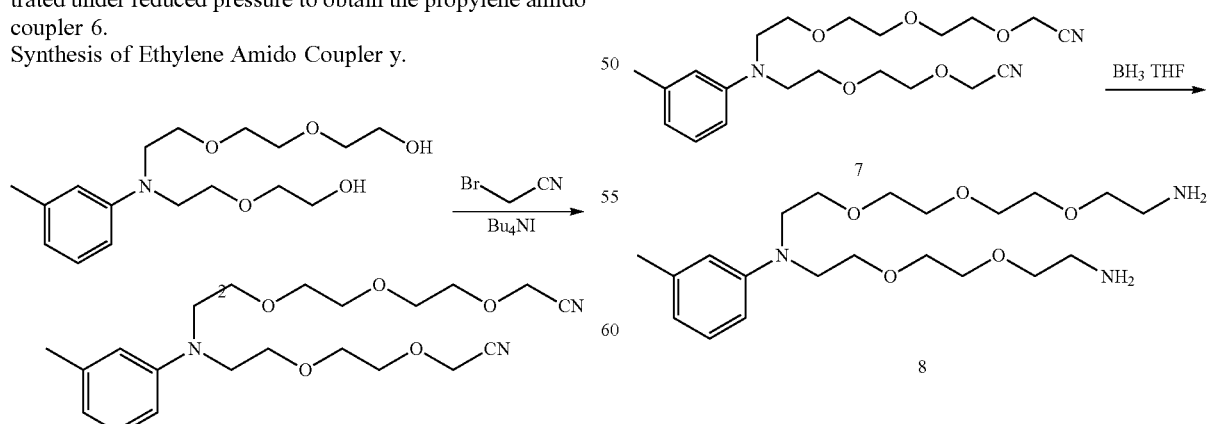

To a solution of the ethoxylated meta-toluidine 2 (4.1 mmol) in dichloromethane (23 ml) is subsequently added at 22° C. 2-bromoacetonitrile (6.2 mmol), silver(I) oxide (1.9 g) and tetrabutylammonium iodide (0.30 g) and stirring is continued for at least 2 h. The suspension is filtered, the filtrate is washed with aqueous saturated NaHCO$_3$ solution, and the organic layer is dried and evaporated to give the nitrile 7 which was used without further purification.

Preparation of the bis-amine coupling precursor 8 is accomplished according to the procedure described above for the homologous bis-amine 4 substituting the nitrile 7 for nitrile 3.

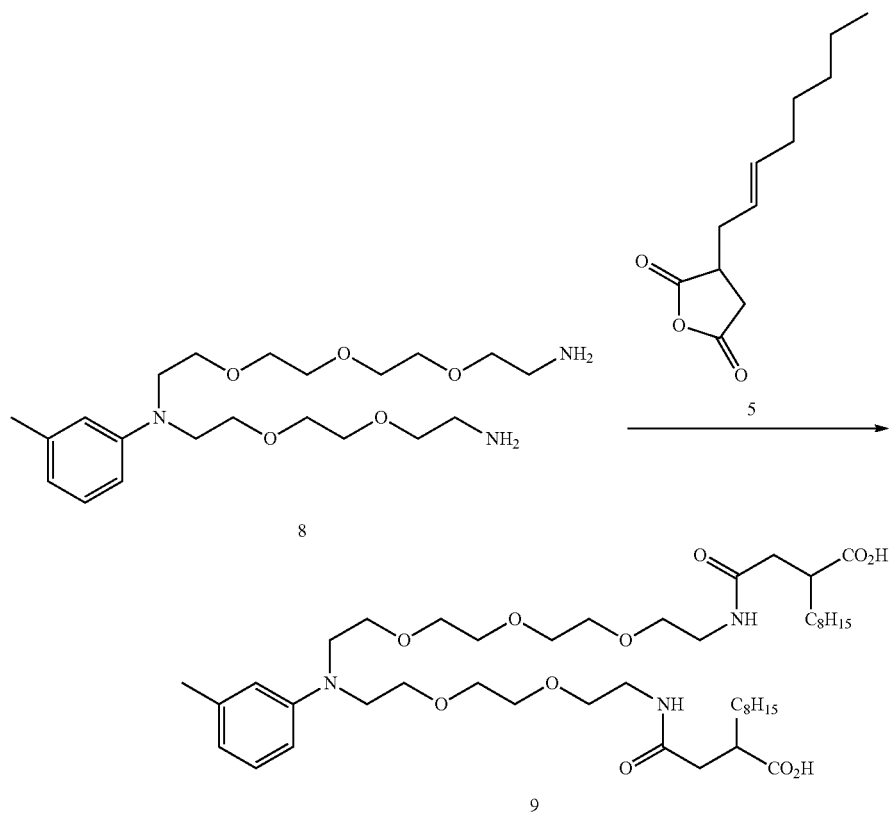

Similarly, by substituting the bis-amine coupling precursor 8 for the homologous compound 4 above, reaction according to the disclosed procedure yields the ethylene amido coupler 9.

Synthesis of Dye Compound 8

2-Amino-6-methylsulfonylbenzothiazole 7 (5.7 g, 0.025 mol) is dissolved in a mixture of $H_2O$ (62.5 g) and $H_2SO_4$ (62.5 g) at 60° C. The solution is cooled to −10° C. and sodium nitrite (1.75 g, 0.025 mol) in $H_2SO_4$ (12.5 g) is added. Maintaining the solution temperature at −5° C., diazotization is continued for 75 min. Propylene amido

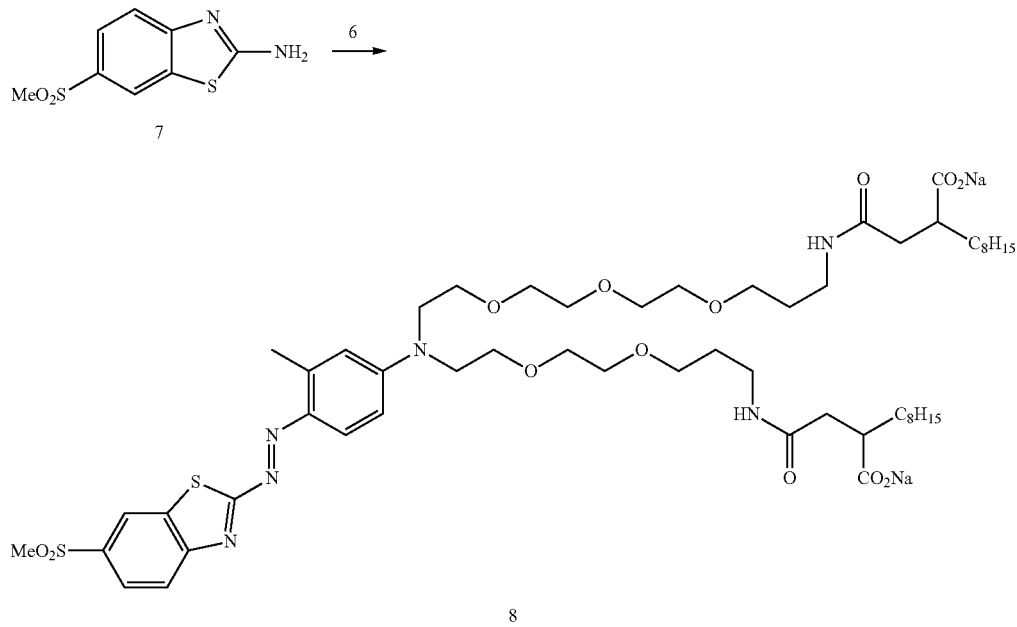

coupler 6 (22.7 g, 0.025 mol) is dissolved in H$_2$O (112.5 g) and H$_2$SO$_4$ (12.5 g). The solution is added dropwise into the diazotized solution to facilitate the coupling reaction. The coupling reaction is continued for 30 min., phase separated and the product is dissolved in THF and dried with sodium sulfate. The solution is concentrated under vacuum to obtain the desired dye 7 as a mixture of regioisomers including the one shown above.

Synthesis of Dye Compound 10

Preparation of Precursor Dye 9

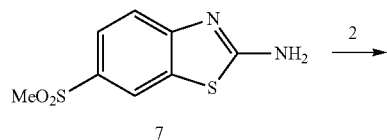

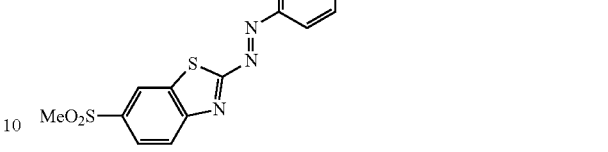

The precursor dye 9 is prepared according to the procedure described above for the preparation of dye 8 except that propylene amido coupler 6 is replaced with ethoxylated meta-toluidine 2.

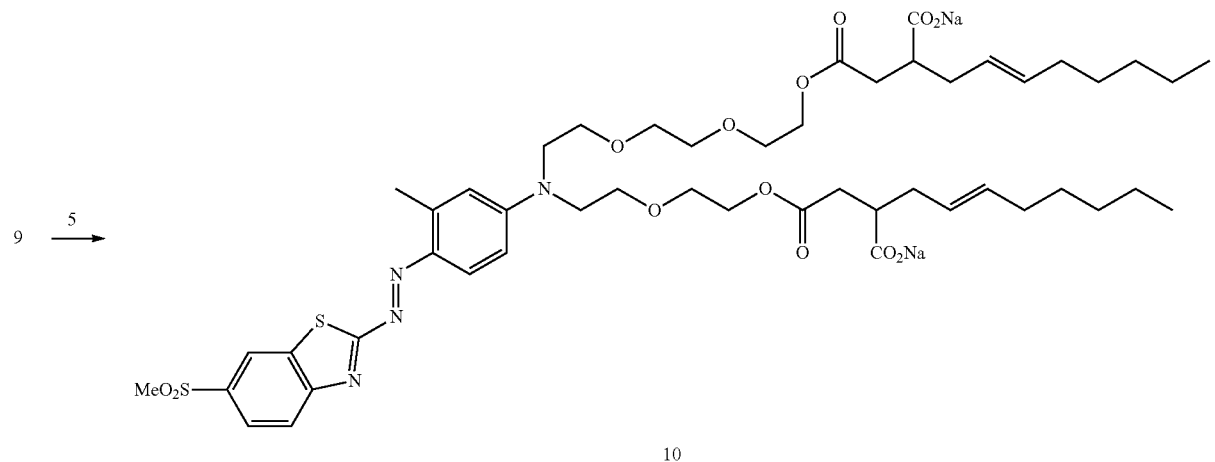

To 28 parts of the precursor dye 9 is added 22 parts of dihydro-3-(2-octen-1-yl)-2,5-furandione 5. The reaction is heated to 85° C. for 12 hours and then cooled down to room temperature. The pH of the mixture is adjusted to 7 using sodium hydroxide, and the water is removed from the mixture via rotary evaporation. The resulting reaction mixture comprises a mixture of regio-isomers of dye 10 including that shown above and is obtained in substantially quantitative conversion as assessed by HPLC.

Synthesis of Coupler 4

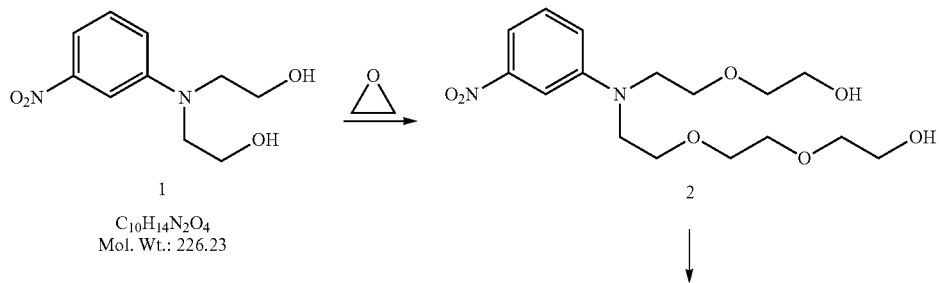

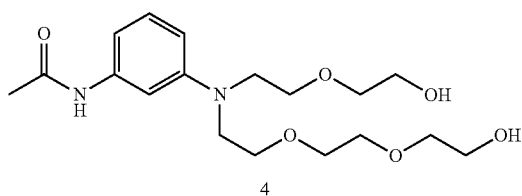 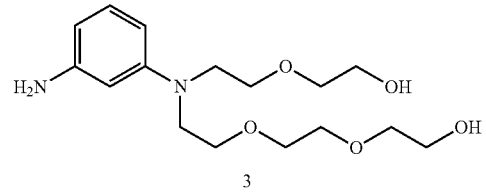

To a solution of 226.2 g (approximately 1.0 mole) of N,N-Bis-(2-hydroxyethyl)-3-nitroaniline 1 (available from Pfalz & Bauer, Waterbury, Conn.) in 200 mL of toluene is added 3 g potassium hydroxide. Thereafter 132 g (3.0 moles) of ethylene oxide is charged to the reaction which is allowed to proceed by means of well known ethoxylation procedures. The toluene is removed under reduced pressure to leave the ethoxylated meta-nitroaniline 2, which is hydrogenated over Pd in refluxing methanol (according to the procedure described for reduction of 1 in WO 2008/153042 A1) to obtain the meta-amino aniline 3. This material is selectively acetylated according to the procedure described in Step 2 of Example 13 in US 2013/0208344, using acetic anhydride in place of isobutyric anhydride, to yield following purification the meta-acetamido aniline 4.

Synthesis of Dye 8A

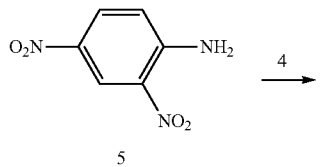

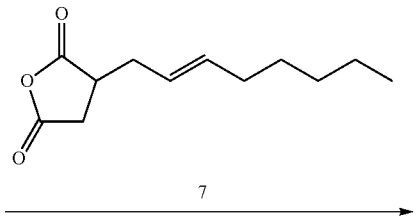

2,4-dinitrobenzeneamine 5 (available from TCI America, Portland, Oreg.) is diazotized and coupled to meta-acetamido aniline 4 according to the general procedure disclosed in Dyes and Pigments 2012, Volume 95, pp. 580-586, Sections 2.3.1 and 2.3.2., to provide dye precursor 6.

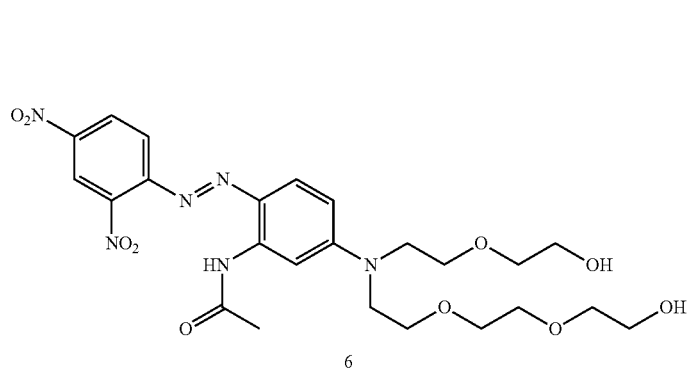

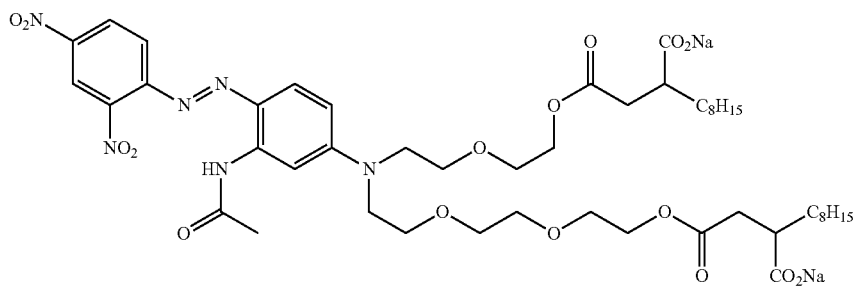

To 28 parts of the precursor dye 6 is added 22 parts of dihydro-3-(2-octen-1-yl)-2,5-furandione 7 (prepared as described in Example 1 of U.S. Pat. No. 5,512,685 to Jarvinen et al.). The reaction is heated to 85° C. for 12 hours and then cooled down to room temperature. The pH of the mixture is adjusted to 7 using sodium hydroxide, and the water is removed from the mixture via rotary evaporation. The resulting reaction mixture comprises a mixture of regio-isomers of dye 8A including that shown above and is obtained in substantially quantitative conversion as assessed by HPLC.

Synthesis of Dye 10A

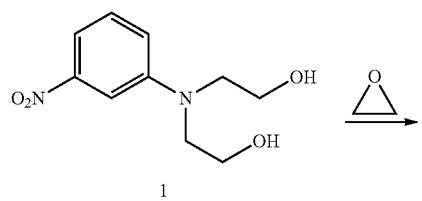

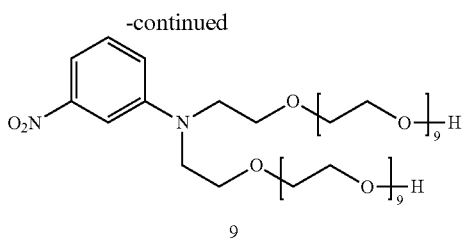

To a solution of 226.2 g (approximately 1.0 mole) of N,N-Bis-(2-hydroxyethyl)-3-nitroaniline 1 (available from Pfalz & Bauer, Waterbury, Conn.) in 200 mL of toluene is added 3 g potassium hydroxide. Thereafter 793 g (18.0 moles) of ethylene oxide is charged to the reaction which is allowed to proceed by means of well known ethoxylation procedures. The toluene is removed under reduced pressure to leave the ethoxylated meta-nitroaniline 2 containing an average of 20 ethoxylate groups.

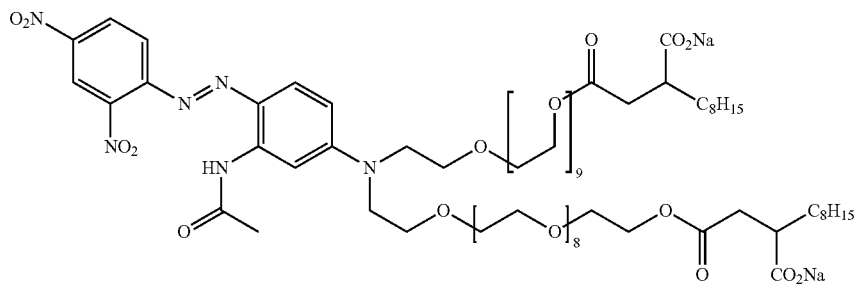

The synthesis of dye 10A is accomplished by following the procedures described above, replacing ethoxylated meta-nitroaniline 2 with ethoxylated meta-nitroaniline 9.

Synthesis of Dye Compound 11

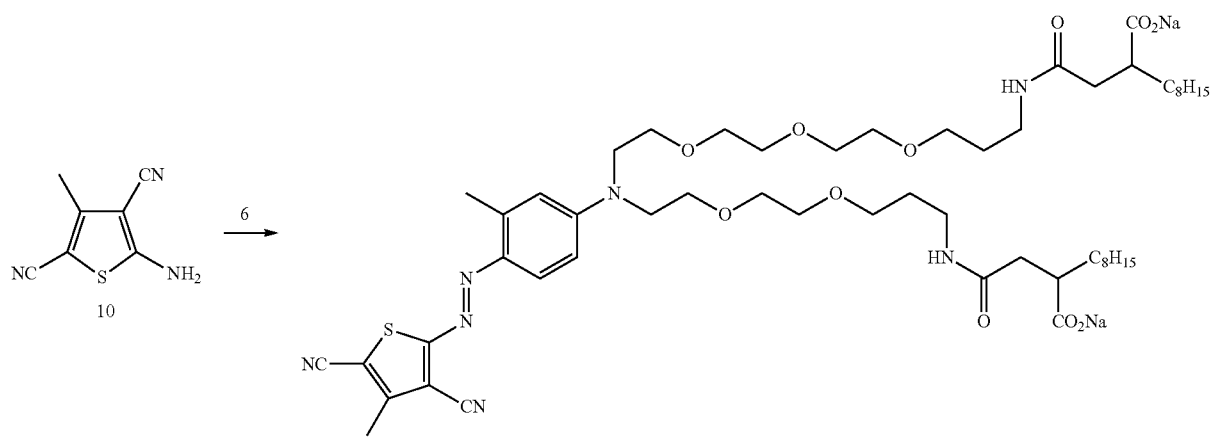

2 parts amino-thiophene 10, and 30 parts phosphoric acid, are charged into 200 mL glass flask and cooled to 0-5° C. 1 part $NaNO_2$ is slowly added as a solid, maintaining the temperature below 10° C. When addition is completed for diazotization, the mixture is stirred for 30 minutes and excess sodium nitrite is consumed by adding 0.3 parts sulfamic acid. Enough sulfamic acid is added until starch iodide paper provides a negative result. 5 parts of the coupler 6 is added to a flask with 100 mL of water and the temperature lowered to 5 C. The prepared diazonium salt solution is slowly added into the above solution for coupling reaction. Care is taken not to allow the temperature to rise above 10° C. After complete addition of diazonium salt solution, the reaction is allowed to slowly reach room temperature over an hour. The mixture is then neutralized with sodium hydroxide and phase separated. The product layer is dissolved with methanol and filtered to remove any excess salts. The filtrate is evaporated and the product of this reaction, dye 11, is ready to use at this point.

Synthesis of Dye Compound 12

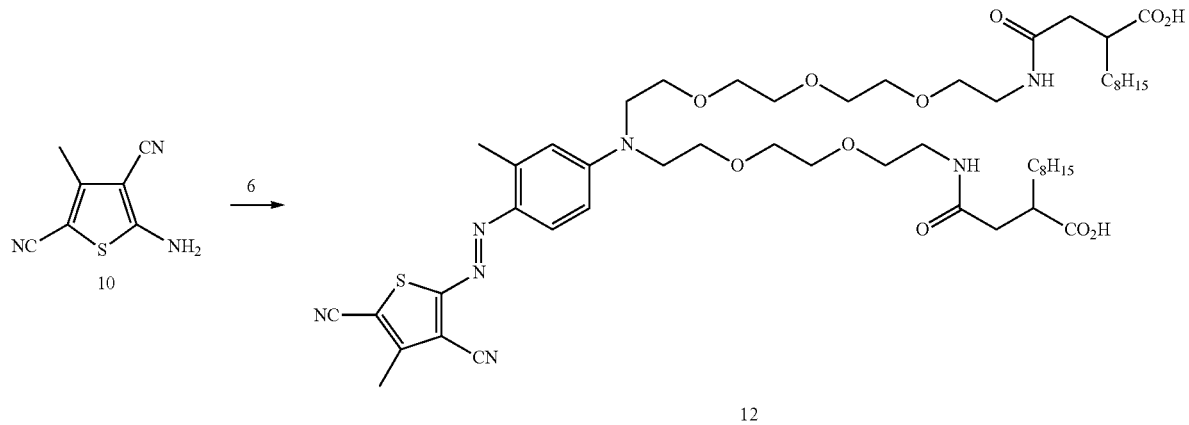

Dye 12 is prepared as described above for Dye 11 except that coupler 9 replaces coupler 6 in the procedure.

Synthesis of Dye Compound 14

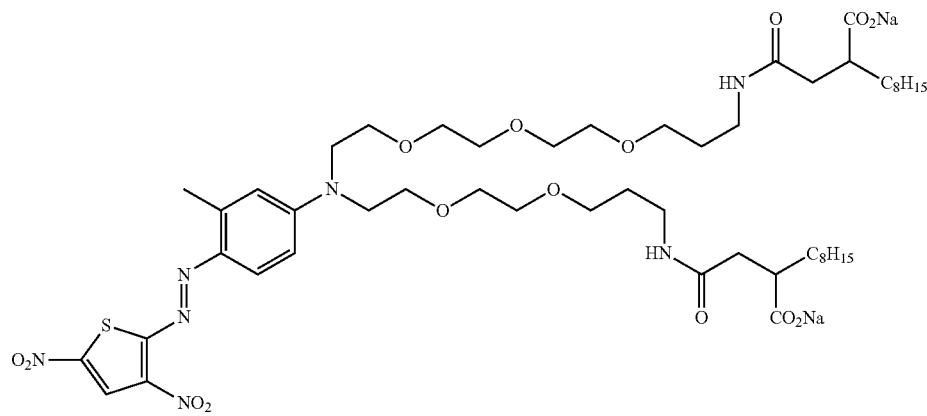

Dye 14 is prepared as described above for Dye 11 except that amino thiophene 13 replaces amino-thiophene 10 in the procedure.

Synthesis of Dye Compound 15

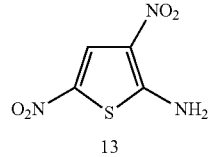 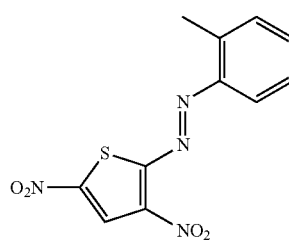 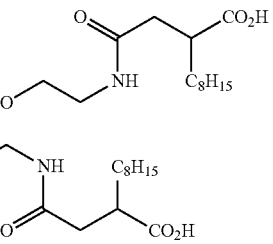

Dye 15 is prepared as described above for Dye 14 except that coupler 9 replaces coupler 6 in the procedure.

Dye Removal from Nylon

I. Method for Determining Hueing Deposition (HD) for Dye from a Wash Solution

Unbrightened multifiber fabric swatches are stripped prior to use by washing at 49° C. two times with heavy duty liquid laundry detergent nil brightener (1.55 g/L in aqueous solution). A concentrated stock solution of each dye to be tested is prepared in a solvent selected from dimethyl sulfoxide, ethanol or 50:50 ethanol:water. Dye stocks are added to beakers containing 400 mL detergent in water (heavy duty liquid laundry detergent nil brightener, 1.55 g per liter) to produce a wash solution with an absorbance of 0.4 AU (±0.01 AU; 1.0 cm cuvette) at the $\lambda_{max}$ of the dye.

A 125 mL aliquot of each wash solution is placed into three 250 mL Erlenmeyer flasks, each containing four swatches. The flasks are placed on a Model 75 wrist action shaker (Burrell Scientific, Inc., Pittsburgh, Pa.) and agitated at the maximum setting for 12 minutes, after which the wash solution is removed by aspiration, 125 mL of rinse water (0 gpg) is added before agitating 4 more minutes. The rinse is removed by aspiration and the fabric swatches are spun dry (Mini Countertop Spin Dryer, The Laundry Alternative Inc., Nashua, N.H.) for 5 minutes, then placed in the dark to dry. L*, a*, and b* values for nylon are measured on the dry swatches using a LabScan XE reflectance spectrophotometer (HunterLabs, Reston, Va.; D65 illumination, 10° observer, UV light excluded). The L*, a*, and b* values of the 12 swatches generated for each dye are averaged and the hueing deposition (HD) of each dye is calculated for nylon using the following equation:

$$HD=DE^*=((L^*_c-L^*_s)^2+(a^*_c-a^*_s)^2+(b^*_c-b^*_s)^2)^{1/2}$$

wherein the subscripts c and s respectively refer to the control, i.e., the fabric washed in detergent with no dye, and the sample, i.e., the fabric washed in detergent containing dye.

II. Method for Determining Deposition Index (DI)

The parameters described in II. (a.)-(d.) below are calculated only when at least one of the individual deposition (HD) values for nylon is ≥2.0.

a.) the Average Deposition (AHD) is calculated using the following:

AHD=(Cotton HD+Nylon HD+Polyester HD)/3 b.) The Hueing Deposition Variation (DV) is calculated using the following:

DV=Largest HD−Smallest HD c.) From the AHD and HDV we derive the Hueing Deposition Homogeneity (HDH) using the following formula:

HDH=AHD/(AHD+DV)

i.e. a value of 1.0 represents a perfect dye, one that deposits equally well on all three fabrics.

d.) The Hueing Deposition Index (DI) is calculated as follows:

DI=AHD×HDH

III. Method for Determining Percent Removability

Sufficient volume of AATCC standard nil brightener HDL detergent at 1.55 g per liter was prepared in 0 gpg water to conduct all treatments.

One of the Gyrowash (Model 415/24(2), James H. Heal & Co. LTD, Halifax England) reservoirs was filled with water and allowed to equilibrate to 49° C. before use. The other reservoir was not filled. Aliquots of 95 mL of detergent prepared above were placed into 500 mL Gyrowash pots along with 50 non-corrodible 6 mm diameter steel balls (Item 718-164, James H. Heal & Co. LTD, Halifax England). Three of the 4 MFF41 swatches from the Method for Determining Hueing Deposition (HD) for Dye from a Wash Solution (described in I. above) were agitated in the Gyrowash 49° C. reservoir for 45 minutes.

The wash solution was removed from the Gyrowash pots by emptying contents into common metal household strainer. All 3 swatches and 50 steel balls were returned to the original pots and an aliquot of 95 mL water (0 gpg) was added to each pot for rinsing. Pots were placed into the Gyrowash with no water in the reservoir and agitated for 5 minutes at RT. The rinse was removed in the same manner as the wash. A second rinse was done in the same manner as the first. Excess water was extracted from the swatches by spin drying in a Mini Countertop Spin Dryer for 5 minutes. Swatches were placed in a darkened fume hood to dry.

When completely dry, L*, a*, and b* measurements of each fabric type on each swatch were taken using the reflectance spectrophotometer. The amount of residual hue (RH) was assessed by calculating using the following equation:

$$RH = DE^* = ((L^*_c - L^*_r)^2 + (a^*_c - a^*_r)^2 + (b^*_c - b^*_r)^2)^{1/2}$$

wherein the subscripts c and r respectively refer to control wash and removal wash.

d.) The Percent Removal values for a dye were calculated according to the formula:

$$PR = 100 \times (1 - RH/HD)$$

A PR value was calculated for nylon and is shown in the table below.

| Dye | % Dye Removal from Nylon |
|---|---|
| Comparative Dye A | 5.9 |
| Inventive Dye B | 76.4 |

The performance of Dye A (Violet DD comparative dye) and Dye B (Example 1) are tested and % dye removal from nylon is assessed according to the equations disclosed in the methods. The results are given in the Table.

Dye B is easily removed from nylon whereas the comparative dye A is very difficult to remove from nylon.

Suitable dyes according to the instant invention include, but are not limited to the following:

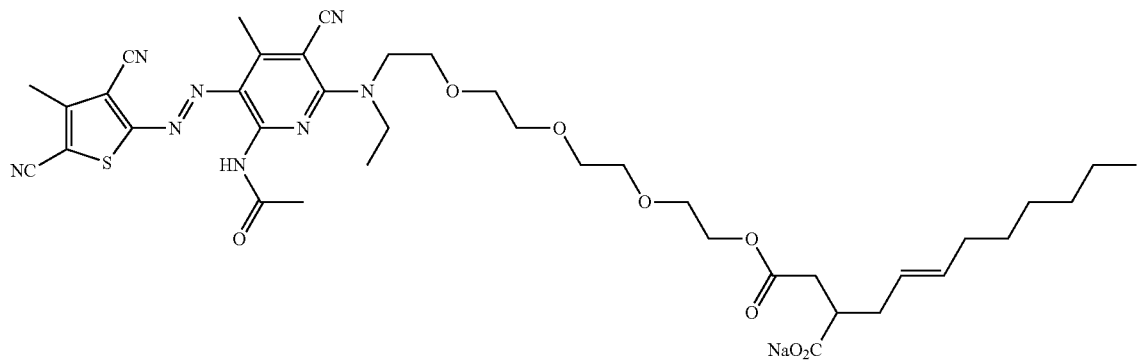

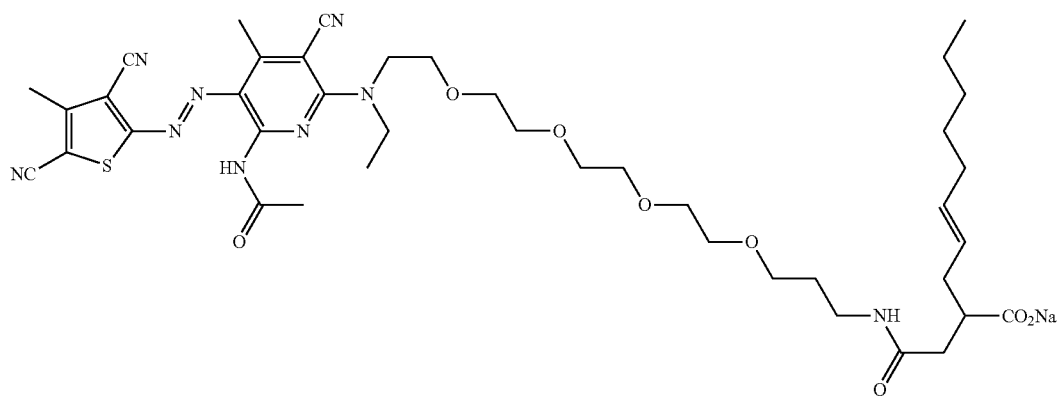

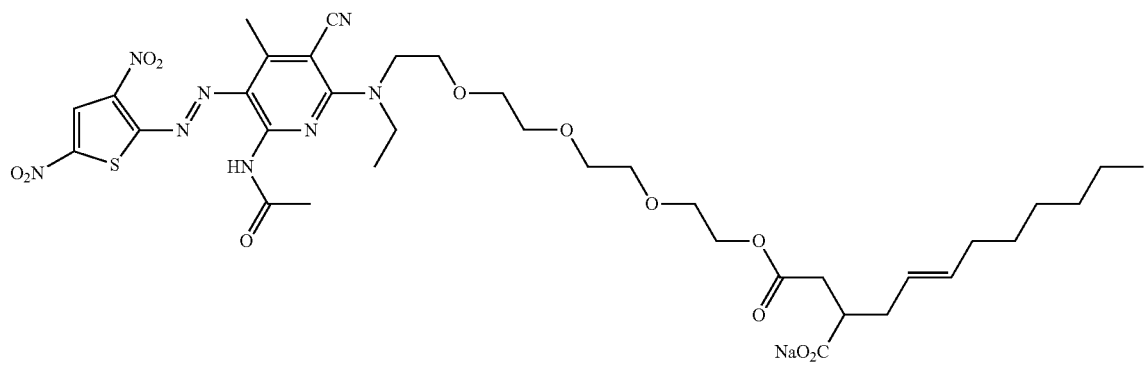

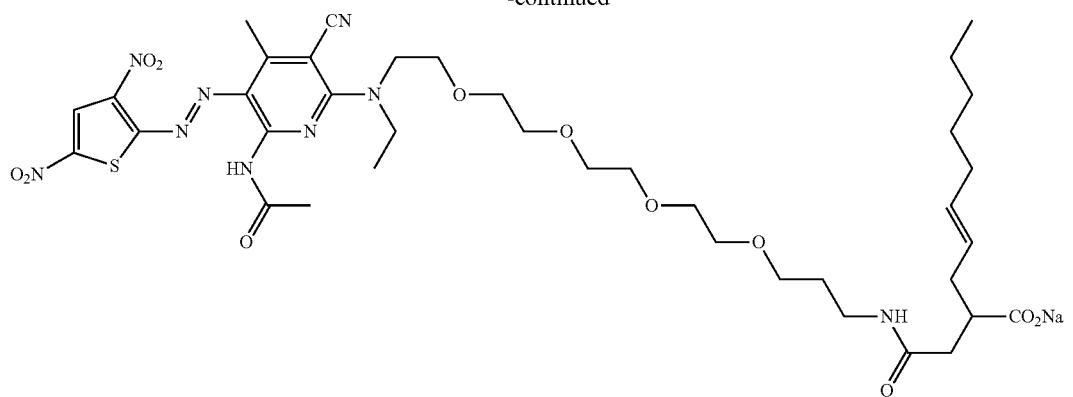
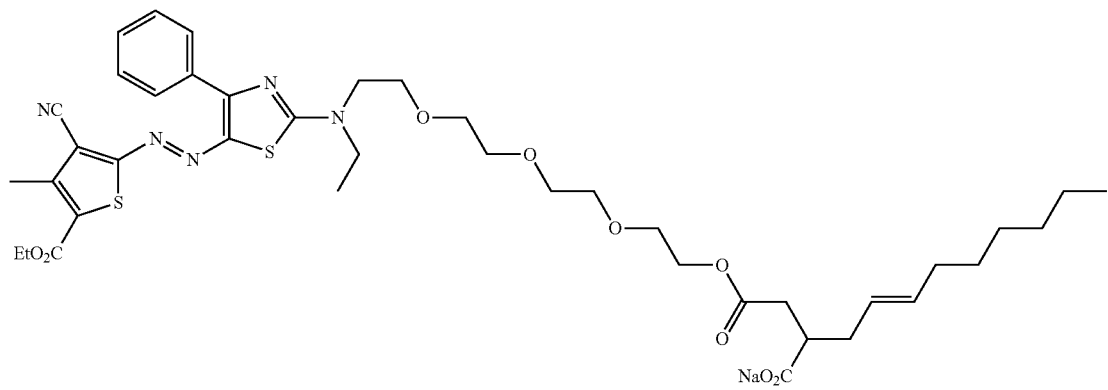
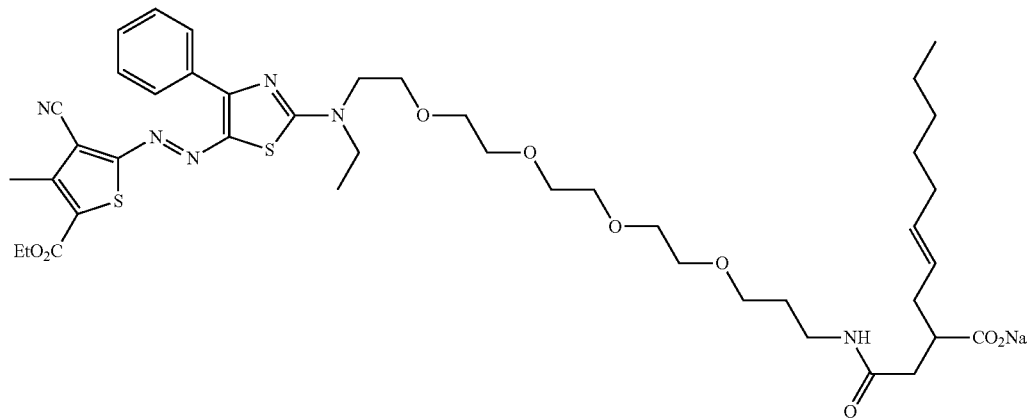
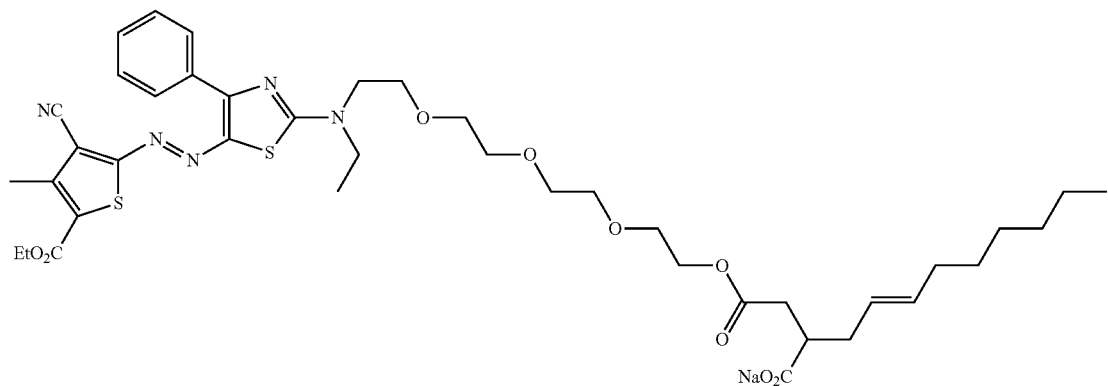

-continued
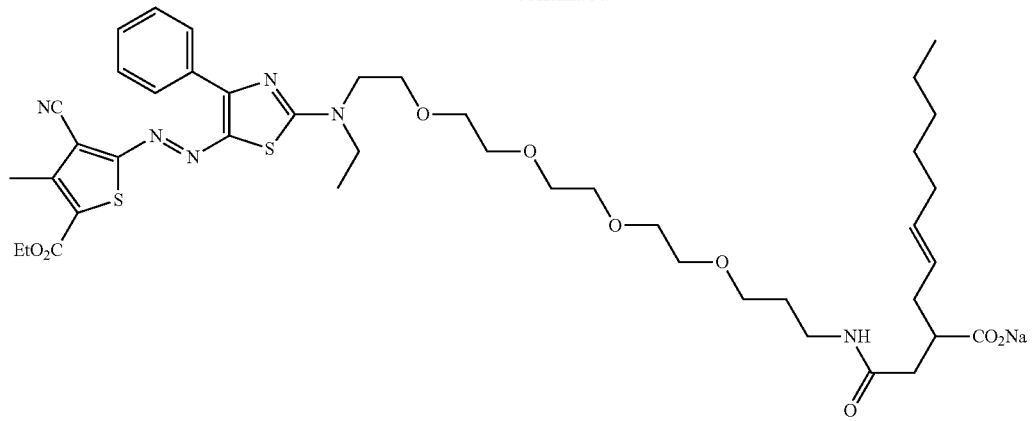
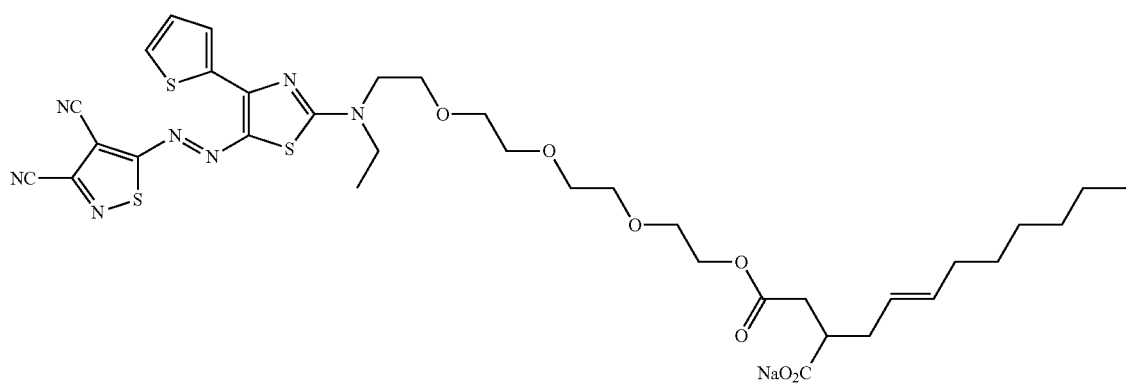
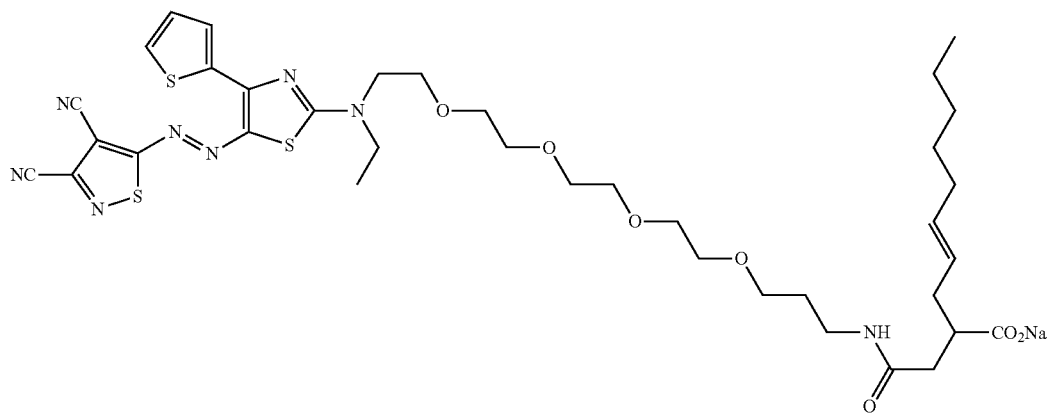
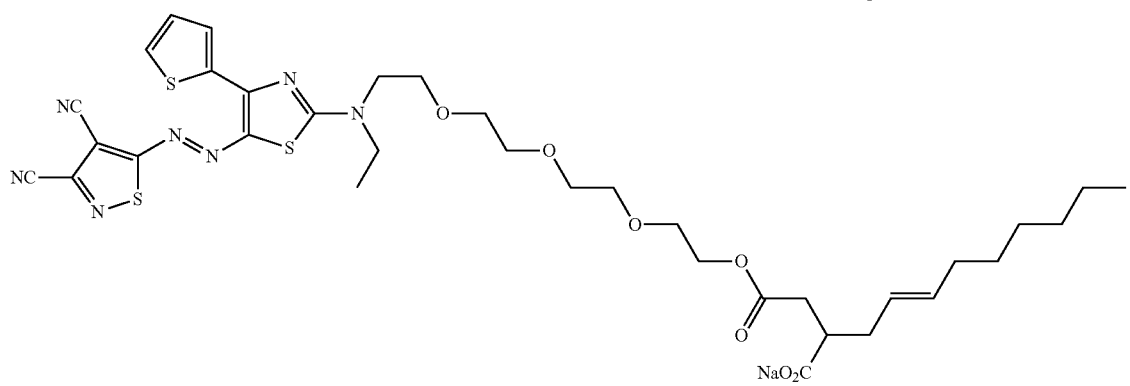

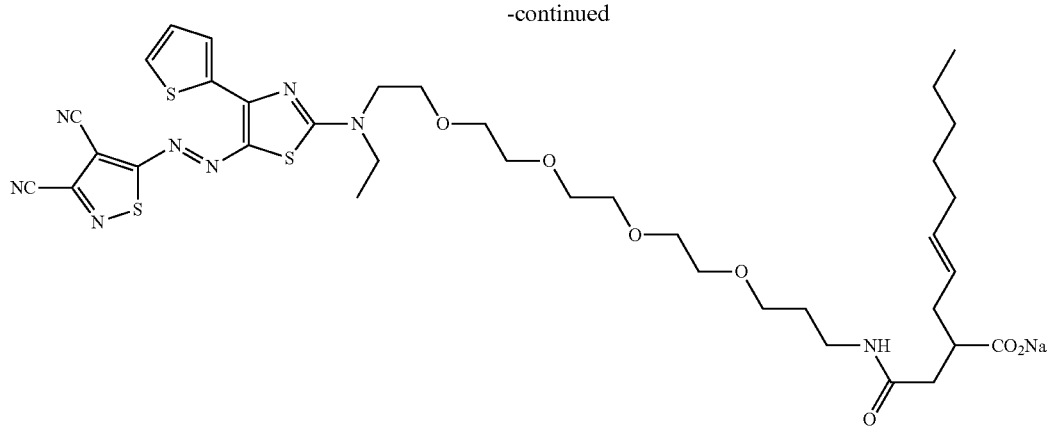

Examples 2-7

Granular Laundry Detergent Compositions for Hand Washing or Washing Machines, Typically Top-Loading Washing Machines

| | 2 (wt %) | 3 (wt %) | 4 (wt %) | 5 (wt %) | 6 (wt %) | 7 (wt %) |
|---|---|---|---|---|---|---|
| Linear alkylbenzenesulfonate | 20 | 22 | 20 | 15 | 19.5 | 20 |
| $C_{12-14}$ Dimethylhydroxyethyl ammonium chloride | 0.7 | 0.2 | 1 | 0.6 | 0.0 | 0 |
| AE3S | 0.9 | 1 | 0.9 | 0.0 | 0.4 | 0.9 |
| AE7 | 0.0 | 0.0 | 0.0 | 1 | 0.1 | 3 |
| Sodium tripolyphosphate | 5 | 0.0 | 4 | 9 | 2 | 0.0 |
| Zeolite A | 0.0 | 1 | 0.0 | 1 | 4 | 1 |
| 1.6R Silicate ($SiO_2$:$Na_2O$ at ratio 1.6:1) | 7 | 5 | 2 | 3 | 3 | 5 |
| Sodium carbonate | 25 | 20 | 25 | 17 | 18 | 19 |
| Polyacrylate MW 4500 | 1 | 0.6 | 1 | 1 | 1.5 | 1 |
| Random graft copolymer[1] | 0.1 | 0.2 | 0.0 | 0.0 | 0.05 | 0.0 |
| Carboxymethyl cellulose | 1 | 0.3 | 1 | 1 | 1 | 1 |
| Stainzyme ® (20 mg active/g) | 0.1 | 0.2 | 0.1 | 0.2 | 0.1 | 0.1 |
| Protease (Savinase ®, 32.89 mg active/g) | 0.1 | 0.1 | 0.1 | 0.1 | | 0.1 |
| Amylase - Natalase ® (8.65 mg active/g) | 0.1 | 0.0 | 0.1 | 0.0 | 0.1 | 0.1 |
| Lipase - Lipex ® (18 mg active/g) | 0.03 | 0.07 | 0.3 | 0.1 | 0.07 | 0.4 |
| Invention Dye according to example 1 | 0.01 | 0.001 | 0.003 | 0.0005 | 0.002 | 0.0009 |
| Fluorescent Brightener 1 | 0.06 | 0.0 | 0.06 | 0.18 | 0.06 | 0.06 |
| Fluorescent Brightener 2 | 0.1 | 0.06 | 0.1 | 0.0 | 0.1 | 0.1 |
| DTPA | 0.6 | 0.8 | 0.6 | 0.25 | 0.6 | 0.6 |
| $MgSO_4$ | 1 | 1 | 1 | 0.5 | 1 | 1 |
| Sodium Percarbonate | 0.0 | 5.2 | 0.1 | 0.0 | 0.0 | 0.0 |
| Sodium Perborate Monohydrate | 4.4 | 0.0 | 3.85 | 2.09 | 0.78 | 3.63 |
| NOBS | 1.9 | 0.0 | 1.66 | 0.0 | 0.33 | 0.75 |
| TAED | 0.58 | 1.2 | 0.51 | 0.0 | 0.015 | 0.28 |
| Sulphonated zinc phthalocyanine | 0.0030 | 0.0 | 0.0012 | 0.0030 | 0.0021 | 0.0 |
| S-ACMC | 0.1 | 0.0 | 0.0 | 0.0 | 0.06 | 0.0 |
| Direct Violet Dye (DV9 or DV99 or DV66) | 0.0 | 0.0 | 0.0003 | 0.0001 | 0.0001 | 0.0 |
| Sulfate/Moisture | | | Balance | | | |

Examples 8-13

Granular Laundry Detergent Compositions Typically for Front-Loading Automatic Washing Machines

| | 8 (wt %) | 9 (wt %) | 10 (wt %) | 11 (wt %) | 12 (wt %) | 13 (wt %) |
|---|---|---|---|---|---|---|
| Linear alkylbenzenesulfonate | 8 | 7.1 | 7 | 6.5 | 7.5 | 7.5 |
| AE3S | 0 | 4.8 | 1.0 | 5.2 | 4 | 4 |
| C12-14 Alkylsulfate | 1 | 0 | 1 | 0 | 0 | 0 |
| AE7 | 2.2 | 0 | 2.2 | 0 | 0 | 0 |
| $C_{10-12}$ Dimethyl hydroxyethylammonium chloride | 0.75 | 0.94 | 0.98 | 0.98 | 0 | 0 |
| Crystalline layered silicate ($\delta$-$Na_2Si_2O_5$) | 4.1 | 0 | 4.8 | 0 | 0 | 0 |
| Zeolite A | 5 | 0 | 5 | 0 | 2 | 2 |
| Citric Acid | 3 | 5 | 3 | 4 | 2.5 | 3 |
| Sodium Carbonate | 15 | 20 | 14 | 20 | 23 | 23 |
| Silicate 2R ($SiO_2$:$Na_2O$ at ratio 2:1) | 0.08 | 0 | 0.11 | 0 | 0 | 0 |
| Soil release agent | 0.75 | 0.72 | 0.71 | 0.72 | 0 | 0 |
| Acrylic Acid/Maleic Acid Copolymer | 1.1 | 3.7 | 1.0 | 3.7 | 2.6 | 3.8 |
| Carboxymethylcellulose | 0.15 | 1.4 | 0.2 | 1.4 | 1 | 0.5 |
| Protease - Purafect ® (84 mg active/g) | 0.2 | 0.2 | 0.3 | 0.15 | 0.12 | 0.13 |
| Amylase - Stainzyme Plus ® (20 active/g) | 0.2 | 0.15 | 0.2 | 0.3 | 0.15 | 0.15 |
| Lipase - Lipex ® (18.00 mg active/g) | 0.05 | 0.15 | 0.1 | 0 | 0 | 0 |
| Amylase - Natalase ® (8.65 mg active/g) | 0.1 | 0.2 | 0 | 0 | 0.15 | 0.15 |
| Cellulase - Celluclean ™ (15.6 mg active/g) | 0 | 0 | 0 | 0 | 0.1 | 0.1 |
| Invention Dye according to example 1 | 0.01 | 0.006 | 0.008 | 0.007 | 0.02 | 0.005 |
| TAED | 3.6 | 4.0 | 3.6 | 4.0 | 2.2 | 1.4 |
| Percarbonate | 13 | 13.2 | 13 | 13.2 | 16 | 14 |
| Na salt of Ethylenediamine-N,N'-disuccinic acid, (S,S) isomer (EDDS) | 0.2 | 0.2 | 0.2 | 0.2 | 0.2 | 0.2 |
| Hydroxyethane di phosphonate (HEDP) | 0.2 | 0.2 | 0.2 | 0.2 | 0.2 | 0.2 |
| $MgSO_4$ | 0.42 | 0.42 | 0.42 | 0.42 | 0.4 | 0.4 |
| Perfume | 0.5 | 0.6 | 0.5 | 0.6 | 0.6 | 0.6 |
| Suds suppressor agglomerate | 0.05 | 0.1 | 0.05 | 0.1 | 0.06 | 0.05 |
| Soap | 0.45 | 0.45 | 0.45 | 0.45 | 0 | 0 |
| Sulphonated zinc phthalocyanine (active) | 0.0007 | 0.0012 | 0.0007 | 0 | 0 | 0 |
| S-ACMC | 0.01 | 0.01 | 0 | 0.01 | 0 | 0 |
| Direct Violet 9 (active) | 0 | 0 | 0.0001 | 0.0001 | 0 | 0 |
| Sulfate/Water & Miscellaneous | | | Balance | | | |

Any of the above compositions is used to launder fabrics at a concentration of 7000 to 10000 ppm in water, 20-90° C., and a 5:1 water:cloth ratio. The typical pH is about 10. The fabrics are then dried. In one aspect, the fabrics are actively dried using a dryer. In one aspect, the fabrics are actively dried using an iron. In another aspect, the fabrics are merely allowed to dry on a line wherein they are exposed to air and optionally sunlight.

Examples 14-20 Heavy Duty Liquid Laundry Detergent Compositions

| | 14 (wt %) | 15 (wt %) | 16 (wt %) | 17 (wt %) | 18 (wt %) | 19 (wt %) | 20 (wt %) |
|---|---|---|---|---|---|---|---|
| AES $C_{12-15}$ alkyl ethoxy (1.8) sulfate | 11 | 10 | 4 | 6.32 | 0 | 0 | 0 |
| AE3S | 0 | 0 | 0 | 0 | 2.4 | 0 | 0 |
| Linear alkyl benzene sulfonate/sulfonic acid | 1.4 | 4 | 8 | 3.3 | 5 | 8 | 19 |
| HSAS | 3 | 5.1 | 3 | 0 | 0 | 0 | 0 |
| Sodium formate | 1.6 | 0.09 | 1.2 | 0.04 | 1.6 | 1.2 | 0.2 |
| Sodium hydroxide | 2.3 | 3.8 | 1.7 | 1.9 | 1.7 | 2.5 | 2.3 |

-continued

|  | 14 (wt %) | 15 (wt %) | 16 (wt %) | 17 (wt %) | 18 (wt %) | 19 (wt %) | 20 (wt %) |
|---|---|---|---|---|---|---|---|
| Monoethanolamine | 1.4 | 1.49 | 1.0 | 0.7 | 0 | 0 | To pH 8.2 |
| Diethylene glycol | 5.5 | 0.0 | 4.1 | 0.0 | 0 | 0 | 0 |
| AE9 | 0.4 | 0.6 | 0.3 | 0.3 | 0 | 0 | 0 |
| AE8 | 0 | 0 | 0 | 0 | 0 | 0 | 20.0 |
| AE7 | 0 | 0 | 0 | 0 | 2.4 | 6 | 0 |
| Chelant (HEDP) | 0.15 | 0.15 | 0.11 | 0.07 | 0.5 | 0.11 | 0.8 |
| Citric Acid | 2.5 | 3.96 | 1.88 | 1.98 | 0.9 | 2.5 | 0.6 |
| $C_{12-14}$ dimethyl Amine Oxide | 0.3 | 0.73 | 0.23 | 0.37 | 0 | 0 | 0 |
| $C_{12-18}$ Fatty Acid | 0.8 | 1.9 | 0.6 | 0.99 | 1.2 | 0 | 15.0 |
| 4-formyl-phenylboronic acid | 0 | 0 | 0 | 0 | 0.05 | 0.02 | 0.01 |
| Borax | 1.43 | 1.5 | 1.1 | 0.75 | 0 | 1.07 | 0 |
| Ethanol | 1.54 | 1.77 | 1.15 | 0.89 | 0 | 3 | 7 |
| A compound having the following general structure: bis(($C_2H_5O$)($C_2H_4O$)$n$)($CH_3$)—$N^+$—$C_xH_{2x}$—$N^+$—($CH_3$)-bis(($C_2H_5O$)($C_2H_4O$)$n$), wherein n = from 20 to 30, and x = from 3 to 8, or sulphated or sulphonated variants thereof | 0.1 | 0 | 0 | 0 | 0 | 0 | 2.0 |
| Ethoxylated ($EO_{15}$) tetraethylene pentamine | 0.3 | 0.33 | 0.23 | 0.17 | 0.0 | 0.0 | 0 |
| Ethoxylated Polyethylenimine[2] | 0 | 0 | 0 | 0 | 0 | 0 | 0.8 |
| Ethoxylated hexamethylene diamine | 0.8 | 0.81 | 0.6 | 0.4 | 1 | 1 | |
| 1,2-Propanediol | 0.0 | 6.6 | 0.0 | 3.3 | 0.5 | 2 | 8.0 |
| Fluorescent Brightener | 0.2 | 0.1 | 0.05 | 0.3 | 0.15 | 0.3 | 0.2 |
| Hydrogenated castor oil derivative structurant | 0.1 | 0 | 0 | 0 | 0 | 0 | 0.1 |
| Perfume | 1.6 | 1.1 | 1.0 | 0.8 | 0.9 | 1.5 | 1.6 |
| Core Shell Melamine-formaldehyde encapsulate of perfume | 0.10 | 0.05 | 0.01 | 0.02 | 0.1 | 0.05 | 0.1 |
| Protease (40.6 mg active/g) | 0.8 | 0.6 | 0.7 | 0.9 | 0.7 | 0.6 | 1.5 |
| Mannanase: Mannaway ® (25 mg active/g) | 0.07 | 0.05 | 0.045 | 0.06 | 0.04 | 0.045 | 0.1 |
| Amylase: Stainzyme ® (15 mg active/g) | 0.3 | 0 | 0.3 | 0.1 | 0 | 0.4 | 0.1 |
| Amylase: Natalase ® (29 mg active/g) | 0 | 0.2 | 0.1 | 0.15 | 0.07 | 0 | 0.1 |
| Xyloglucanase (Whitezyme ®, 20 mg active/g) | 0.2 | 0.1 | 0 | 0 | 0.05 | 0.05 | 0.2 |
| Lipex ® (18 mg active/g) | 0.4 | 0.2 | 0.3 | 0.1 | 0.2 | 0 | 0 |
| Invention Dye according to example 1 | 0.006 | 0.002 | 0.001 | 0.01 | 0.005 | 0.003 | 0.004 |
| *Water, dyes & minors | | | | Balance | | | |

*Based on total cleaning and/or treatment composition weight, a total of no more than 12% water Examples 21 to 25 Unit Dose Compositions This Example provides various formulations for unit dose laundry detergents. Such unit dose formulations can comprise one or multiple compartments.

The following unit dose laundry detergent formulations of the present invention are provided below.

| Ingredients | 21 | 22 | 23 | 24 | 25 |
|---|---|---|---|---|---|
| Alkylbenzene sulfonic acid C 11-13, 23.5% 2-phenyl isomer | 14.5 | 14.5 | 14.5 | 14.5 | 14.5 |
| $C_{12-14}$ alkyl ethoxy 3 sulfate | 7.5 | 7.5 | 7.5 | 7.5 | 7.5 |
| $C_{12-14}$ alkyl 7-ethoxylate | 13.0 | 13.0 | 13.0 | 13.0 | 13.0 |
| Citric Acid | 0.6 | 0.6 | 0.6 | 0.6 | 0.6 |
| Fatty Acid | 14.8 | 14.8 | 14.8 | 14.8 | 14.8 |
| Enzymes (as % raw material not active) | 1.7 | 1.7 | 1.7 | 1.7 | 1.7 |
| Ethoxylated Polyethylenimine[1] | 4.0 | 4.0 | 4.0 | 4.0 | 4.0 |
| Invention Dye according to example 1 | 0.005 | 0.006 | 0.003 | 0.001 | 0.1 |
| Hydroxyethane diphosphonic acid | 1.2 | 1.2 | 1.2 | 1.2 | 1.2 |
| Brightener | 0.3 | 0.3 | 0.3 | 0.3 | 0.3 |
| P-diol | 15.8 | 13.8 | 13.8 | 13.8 | 13.8 |
| Glycerol | 6.1 | 6.1 | 6.1 | 6.1 | 6.1 |
| MEA | 8.0 | 8.0 | 8.0 | 8.0 | 8.0 |
| TIPA | — | — | 2.0 | — | — |

-continued

| Ingredients | 21 | 22 | 23 | 24 | 25 |
|---|---|---|---|---|---|
| TEA | — | 2.0 | — | — | — |
| Cumene sulphonate | — | — | — | — | 2.0 |
| cyclohexyl dimethanol | — | — | — | 2.0 | — |
| Water | 10 | 10 | 10 | 10 | 10 |
| Structurant | 0.14 | 0.14 | 0.14 | 0.14 | 0.14 |
| Perfume | 1.9 | 1.9 | 1.9 | 1.9 | 1.9 |
| Buffers (monoethanolamine) | To pH 8.0 | | | | |
| Solvents (1,2 propanediol, ethanol) | To 100% | | | | |

Example 26 Multiple Compartment Unit Dose Compositions

Multiple compartment unit dose laundry detergent formulations of the present invention are provided below. In these examples the unit dose has three compartments, but similar compositions can be made with two, four or five compartments. The film used to encapsulate the compartments is polyvinyl alcohol.

| | Base Composition | | | |
|---|---|---|---|---|
| Ingredients % | 26 | 27 | 28 | 29 |
| Glycerol | 5.3 | 5.0 | 5.0 | 4.2 |
| 1,2-propanediol | 10.0 | 15.3 | 17.5 | 16.4 |
| Citric Acid | 0.5 | 0.7 | 0.6 | 0.5 |
| Monoethanolamine | 10.0 | 8.1 | 8.4 | 7.6 |
| Caustic soda | — | — | — | — |
| Hydroxyethane diphosphonic acid | 1.1 | 2.0 | 0.6 | 1.5 |
| Polyethylene glycol | 0 | 0 | 2.5 | 3.0 |
| Potassium sulfite | 0.2 | 0.3 | 0.5 | 0.7 |
| Nonionic Marlipal C24EO$_7$ | 20.1 | 14.3 | 13.0 | 18.6 |
| HLAS | 24.6 | 18.4 | 17.0 | 14.8 |
| Fluorescent Brightener 1 +/or 2 | 0.2 | 0.2 | 0.02 | 0.3 |
| Enzymes: protease, amylase, mannanase, lipase, cellulose and/or pectate lyase | 1.5 | 1.5 | 1.0 | 0.4 |
| C12-15 Fatty acid | 16.4 | 6.0 | 11.0 | 13.0 |
| bis(($C_2H_5O$)($C_2H_4O$)n)($CH_3$)—$N^+$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 2.9 | 0.1 | 0 | 0 |
| Polyethyleneimine ethoxylate PEI600 E20 | 1.1 | 5.1 | 2.5 | 4.2 |
| Cationic cellulose polymer | 0 | 0 | 0.3 | 0.5 |
| Random graft copolymer | 0 | 1.5 | 0.3 | 0.2 |

| | Base Composition | | | |
|---|---|---|---|---|
| Ingredients % | 26 | 27 | 28 | 29 |
| MgCl$_2$ | 0.2 | 0.2 | 0.1 | 0.3 |
| Structurant | 0.2 | 0.12 | 0.2 | 0.2 |
| Perfume (may include perfume microcapsules) | 0.1 | 0.3 | 0.01 | 0.05 |
| Solvents (1,2 propanediol, ethanol) and optional aesthetics | To 100% | To 100% | To 100% | To 100% |

| | Composition | | | | | |
|---|---|---|---|---|---|---|
| | 30 | | | 31 | | |
| Compartment | A | B | C | A | B | C |
| Volume of each compartment | 40 ml | 5 ml | 5 ml | 40 ml | 5 ml | 5 ml |
| Active material in Wt. % | | | | | | |
| Perfume | 1.6 | 1.6 | 1.6 | 1.6 | 1.6 | 1.6 |
| Invention Dye according to example 1 | 0 | 0.006 | 0 | 0 | 0 | 0.04 |
| TiO2 | — | — | — | — | 0.1 | — |
| Sodium Sulfite | 0.4 | 0.4 | 0.4 | 0.3 | 0.3 | 0.3 |
| Acusol 305, Rohm&Haas | — | — | 2 | — | — | — |
| Hydrogenated castor oil | 0.14 | 0.14 | 0.14 | 0.14 | 0.14 | 0.14 |
| Base Composition 26, 27, 28 or 29 | Add to 100% | Add to 100% | Add to 100% | Add to 100% | Add to 100% | Add to 100% |

| | Composition | | | | | |
|---|---|---|---|---|---|---|
| | 32 | | | 33 | | |
| Compartment | A | B | C | A | B | C |
| Volume of each compartment | 40 ml | 5 ml | 5 ml | 40 ml | 5 ml | 5 ml |
| Active material in Wt. % | | | | | | |
| Perfume | 1.6 | 1.6 | 1.6 | 1.6 | 1.6 | 1.6 |
| Invention Dye according to example 1 | 0 | 0 | <0.05 | <0.01 | 0 | 0 |
| TiO2 | 0.1 | — | — | — | 0.1 | — |
| Sodium Sulfite | 0.4 | 0.4 | 0.4 | 0.3 | 0.3 | 0.3 |
| Acusol 305, Rohm&Haas | 1.2 | — | — | 2 | — | — |
| Hydrogenated castor oil | 0.14 | 0.14 | 0.14 | 0.14 | 0.14 | 0.14 |
| Base Composition 26, 27, 28, 29 | Add to 100% | Add to 100% | Add to 100% | Add to 100% | Add to 100% | Add to 100% |

Example 34

| Bleach & Laundry Additive Detergent Formulations | | | | | | |
|---|---|---|---|---|---|---|
| Ingredients | A | B | C | D | E | F |
| AES[1] | 11.3 | 6.0 | 15.4 | 16.0 | 12.0 | 10.0 |
| LAS[2] | 25.6 | 12.0 | 4.6 | — | — | 26.1 |
| MEA-HSAS[3] | — | — | — | 3.5 | — | — |
| DTPA: Diethylene triamine pentaacetic acid | 0.51 | — | 1.5 | — | — | 2.6 |
| 4,5-Dihydroxy-1,3-benzenedisulfonic acid disodium salt | 1.82 | — | — | — | — | 1.4 |
| 1,2-propandiol | — | 10 | — | — | — | 15 |
| Copolymer of dimethylterephthalate, 1,2-propylene glycol, methyl capped PEG | 2.0 | | | | | |
| Poly(ethyleneimine) ethoxylated, PEI600 E20 | | 1.8 | | | | |
| Acrylic acid/maleic acid copolymer | | | 2.9 | | | |
| Acusol 880 (Hydrophobically Modified Non-Ionic Polyol) | | | | 2.0 | 1.8 | 2.9 |
| Protease (55 mg/g active) | — | — | — | — | 0.1 | 0.1 |
| Amylase (30 mg/g active) | — | — | — | — | — | 0.02 |
| Perfume | — | 0.2 | 0.03 | 0.17 | — | 0.15 |
| Brightener | 0.21 | — | — | 0.15 | — | 0.18 |
| Invention Dye according to example 1 | 0.01 | 0.005 | 0.006 | 0.002 | 0.007 | 0.008 |
| water, other optional agents/components* | to 100% balance | to 100% balance | to 100% balance | to 100% balance | to 100% balance | to 100% balance |

*Other optional agents/components include suds suppressors, structuring agents such as those based on Hydrogenated Castor Oil (preferably Hydrogenated Castor Oil, Anionic Premix), solvents and/or Mica pearlescent aesthetic enhancer.

Raw Materials and Notes for Composition Examples
LAS is linear alkylbenzenesulfonate having an average aliphatic carbon chain length $C_9$-$C_{15}$, (HLAS is acid form). $C_{12-14}$ Dimethylhydroxyethyl ammonium chloride.
AE3S is $C_{12-15}$ alkyl ethoxy (3) sulfate.
AE7 is $C_{12-15}$ alcohol ethoxylate, with an average degree of ethoxylation of 7. AES is $C_{10-18}$ alkyl ethoxy sulfate.
AE9 is $C_{12-13}$ alcohol ethoxylate, with an average degree of ethoxylation of 9.
HSAS or HC1617HSAS is a mid-branched primary alkyl sulfate with average carbon chain length of about 16-17.
Polyacrylate MW 4500 is supplied by BASF, Ludwigshafen, Germany
Carboxymethyl cellulose is Finnfix® V supplied by CP Kelco, Arnhem, Netherlands
Suitable chelants are, for example, diethylenetetraamine pentaacetic acid (DTPA) or Hydroxyethane di phosphonate (HEDP).
Savinase®, Natalase®, Stainzyme®, Lipex®, Celluclean™, Mannaway® and Whitezyme® are all products of Novozymes, Bagsvaerd, Denmark.
Proteases may be supplied by Genencor International, Palo Alto, Calif., USA (e.g. Purafect Prime®) or by Novozymes, Bagsvaerd, Denmark (e.g. Liquanase®, Coronase®).
Fluorescent Brightener 1 is Tinopal® AMS, Fluorescent Brightener 2 is Tinopal® CBS-X.
Direct Violet 9 is Pergasol® Violet BN-Z.NOBS is sodium nonanoyloxybenzenesulfonate. TAED is tetraacetylethylenediamineS-ACMC is carboxymethylcellulose conjugated with C.I. Reactive Blue 19, sold by Megazyme, Wicklow, Ireland under the product name AZO-CM-CELLULOSE.
Soil release agent is Repel-o-tex® PF.
Acrylic Acid/Maleic Acid Copolymer is molecular weight 70,000 and acrylate:maleate ratio 70:30.

EDDS is sodium salt of Ethylenediamine-N,N'-disuccinic acid.
Suds suppressor agglomerate is supplied by Dow Corning, Midland, Mich., USA
HSAS is mid-branched alkyl sulfate as disclosed in U.S. Pat. Nos. 6,020,303 and 6,060,443
$C_{12-14}$ dimethyl Amine Oxide is supplied by Procter & Gamble Chemicals, Cincinnati, USA
Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40:60 and no more than 1 grafting point per 50 ethylene oxide units. Ethoxylated polyethyleneimine is polyethyleneimine (MW=600) with 20 ethoxylate groups per —NH.
Cationic cellulose polymer is LK400, LR400 and/or JR30M from Amerchol Corporation.
Note: all enzyme levels are expressed as % enzyme raw material.

What is claimed is:
1. A mono-azo carboxylate dye selected from

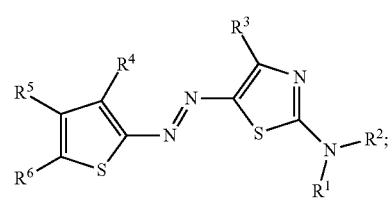

Formula VI

-continued

Formula VII

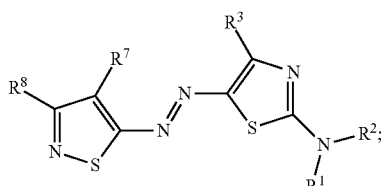

Formula VIII

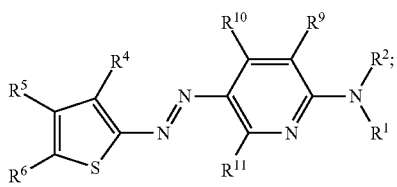

and mixtures thereof,
wherein $R^1$ is Independently selected from the group consisting of:
 (a) unsubstituted or substituted $C_1$ to $C_{12}$ alkyl chains, optionally the alkyl chains comprising ether (C—O—C), ester and/or amide links, optionally, the alkyl chains are substituted with —Cl, —Br, —CN, —NO$_2$, —SO$_2$CH$_3$, —OH and mixtures thereof; and
 (b) $(CH_2CH_2O)_y((CH_2)_wNH)_zQ$;
wherein $R^2$ is $(CH_2CH_2O)_{y'}((CH_2)_{w'}NH)_{z'}Q'$;
wherein y and y' are independently selected integers from 0 to 39;
wherein the sum of y+y' is in the range of from 3 to 30;
wherein w and w' are independently selected from 2 and 3;
wherein z and z' are independently selected from 0 and 1;
wherein z is 1 when y is 0; wherein z' is 1 when y' is 0;
wherein Q and Q' are independently selected from the group consisting of H and Y;

wherein Y is an organic radical represented by Formula V

Formula V

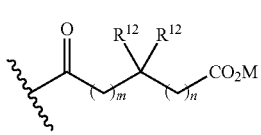

wherein independently for each Y group:
M is H or a charge balancing cation;
m is 0 to 5;
n is 0 to 5;
the sum of m+n is 1 to 10;
each $R^{12}$ is Independently selected from the group consisting of H, $C_{3-18}$ or $C_4$-$C_{18}$ linear or branched alkyl, $C_{3-18}$ or $C_4$-$C_{18}$ linear or branched alkenyl, and mixtures thereof;
at least one $R^{12}$ group is not H;
wherein at least one Q or Q' group is Y;
wherein $R^3$ is selected from acid amide, $C_1$-$C_8$ alkyl, heteroaromatic and aryl;
wherein $R^4$ is selected from CN, NO$_2$, alkoxy, carboxylic acid ester, alkyl sulfonyl and arylsulfonyl;
wherein $R^5$ is selected from F, Cl, Br, CN, NO$_2$, alkoxy, phenyl, benzyl, amine, alkyl, and carboxylic acid ester;
wherein $R^6$ is selected from H, CN, NO$_2$, alkoxy, alkyl sulfonyl, arylsulfonyl and carboxylic acid ester;
wherein $R^7$ is selected from CN, SCN, F, Cl, and Br;
wherein $R^8$ is selected from $C_1$-$C_8$ alkyl, heteroaromatic and aryl;
wherein $R^9$ is selected from CN, NH$_2$C(O), NO$_2$, and acetyl;
wherein $R^{10}$ is selected from $C_3$-$C_8$ alkyl;
wherein $R^{11}$ is an acid amide.

* * * * *

UNITED STATES PATENT AND TRADEMARK OFFICE
CERTIFICATE OF CORRECTION

PATENT NO.        : 9,834,682 B2
APPLICATION NO.   : 14/476852
DATED             : December 5, 2017
INVENTOR(S)       : Eduardo Torres et al.

Page 1 of 1

It is certified that error appears in the above-identified patent and that said Letters Patent is hereby corrected as shown below:

In Column 72, Line 16-18, after the word "of", delete the following:
"H, $C_{3-18}$ or $C_4$-$C_{18}$ linear or branched alkyl, $C_{3-18}$ or $C_4$-$C_{18}$ linear or branched alkenyl, and mixtures thereof;"

And replace with the following:
"H, $C_{3-18}$-linear or $C_{4-18}$-branched alkyl, $C_{3-18}$-linear or $C_{4-18}$-branched alkenyl, and mixtures thereof;"

Signed and Sealed this
Eighth Day of May, 2018

Andrei Iancu
*Director of the United States Patent and Trademark Office*